US011050895B2

(12) United States Patent
Masaru et al.

(10) Patent No.: US 11,050,895 B2
(45) Date of Patent: Jun. 29, 2021

(54) IMAGE READING APPARATUS WITH A NIPPING POSITION ABOVE THE DOCUMENT GUIDE

(71) Applicant: SEIKO EPSON CORPORATION, Tokyo (JP)

(72) Inventors: Sekito Masaru, Kitakyushu (JP); Ryoichi Shuto, Kitakyushu (JP); Kiyotaka Nakamura, Kitakyushu (JP); Masaki Namiki, Shiojiri (JP); Kazuhito Noda, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/936,701

(22) Filed: Jul. 23, 2020

(65) Prior Publication Data

US 2021/0029263 A1 Jan. 28, 2021

(30) Foreign Application Priority Data

Jul. 25, 2019 (JP) .............................. JP2019-137147

(51) Int. Cl.
*H04N 1/04* (2006.01)
*H04N 1/00* (2006.01)

(52) U.S. Cl.
CPC ..... *H04N 1/00607* (2013.01); *H04N 1/00602* (2013.01); *H04N 1/00623* (2013.01); *H04N 1/00631* (2013.01)

(58) Field of Classification Search
CPC .......... H04N 1/00607; H04N 1/00602; H04N 1/00623; H04N 1/00631
USPC ....................................................... 358/474
See application file for complete search history.

(56) References Cited

U.S. PATENT DOCUMENTS

| 3,848,447 | A | * | 11/1974 | Strandell | ................ | B21B 13/12 |
| | | | | | | 72/199 |
| 4,496,984 | A | * | 1/1985 | Stoffel | ................ | H04N 1/0057 |
| | | | | | | 358/296 |
| 5,232,210 | A | * | 8/1993 | Saeki | ..................... | G03G 15/60 |
| | | | | | | 271/3.16 |
| 7,384,038 | B2 | * | 6/2008 | Murai | .................... | B65H 31/02 |
| | | | | | | 271/207 |
| 2001/0021331 | A1 | * | 9/2001 | Brewington | ............... | B41J 3/60 |
| | | | | | | 400/188 |

(Continued)

FOREIGN PATENT DOCUMENTS

JP         2018-016484           2/2018

*Primary Examiner* — Gabriel I Garcia
(74) *Attorney, Agent, or Firm* — Workman Nydegger

(57) ABSTRACT

An image reading apparatus includes a feeding roller configured to feed a document, a separation roller configured to pinch the document with the feeding roller at a nipping position for separation, a first sending roller located downstream of the feeding roller and configured to send the document downstream, a read sensor located downstream of the first sending roller and configured to read the document, and a second sending roller located downstream of the read sensor and configured to send the document downstream. A guide surface is disposed downstream of the nipping position and below a common tangent line to the first sending roller and the second sending roller. The guide surface is positioned to come in contact with a front end of the document sent downward from the nipping position beyond the common tangent line to guide the document upward toward the common tangent line.

9 Claims, 22 Drawing Sheets

(56) References Cited

U.S. PATENT DOCUMENTS

2018/0032018 A1   2/2018   Takatou

* cited by examiner

IMAGE READING APPARATUS WITH A NIPPING POSITION ABOVE THE DOCUMENT GUIDE

The present application is based on, and claims priority from JP Application Serial Number 2019-137147, filed Jul. 25, 2019, the disclosure of which is hereby incorporated by reference herein in its entirety.

BACKGROUND

1. Technical Field

The present disclosure relates to an image reading apparatus that reads images of documents.

2. Related Art

Hereinafter, a scanner is described as an example of an image reading apparatus. A scanner includes an automatic document feeder to automatically feed and scan multi-page documents. In one example, the document feeder includes a document tray having a loading surface on which multi-page documents are loaded, a feeding roller that rotates while being in contact with the documents on the document tray to send out the documents from the document tray, and a separation roller that is in contact with the feeding roller to separate the multi-page documents (for example, JP-A-2018-016484).

In a scanner, for reliable separation of documents, a separation roller is located slightly downstream of a feeding roller such that the front ends of the documents on the document tray come in contact with the outer surface of the separation roller. In this configuration, the traveling direction of the document sent out by the separation roller and the feeding roller is not parallel to the document transportation route and intersects the document transportation route in some cases. Thus, the front end of the document sent from the nipping position where the document is pinched between the feeding roller and the separation roller may catch on a document guide surface, which is located downstream of the nipping position. To solve the problem, the nipping position may be set sufficiently above the document guide surface. However, the space above the separation roller is generally small. In particular, when the document transportation route on which a document travels while being scanned extends obliquely downward, the nipping position set above the document guide surface would directly increase the height of the apparatus.

SUMMARY

The present disclosure for solving the above-described problem is an image reading apparatus including a loading tray on which a document is loaded, a feeding roller configured to be in contact with a first surface of the document that faces the loading tray to feed the document, a separation roller configured to be in contact with a second surface of the document opposite the first surface to pinch the document with the feeding roller for separation, a first sending roller located downstream of the feeding roller on a document transportation route on which the document travels and configured to be in contact with the first surface of the document to send the document downstream on the document transportation route, a read sensor located downstream of the first sending roller on the document transportation route and configured to read the document, and a second sending roller located downstream of the read sensor on the document transportation route on which the document travels and configured to be in contact with the first surface of the document to send the document downstream on the document transportation route. The document transportation route extends obliquely downward from upstream to downstream. A front end of the document is sent downward from a nipping position where the document is pinched between the feeding roller and the separation roller beyond a common tangent line to the first and second sending rollers. A guide surface is disposed downstream of the nipping position on the document transportation route and below the common tangent line. The guide surface allows the front end of the document sent from the nipping position to travel upward and guides the document downstream.

DESCRIPTION OF EXEMPLARY EMBODIMENTS

Figure 1:
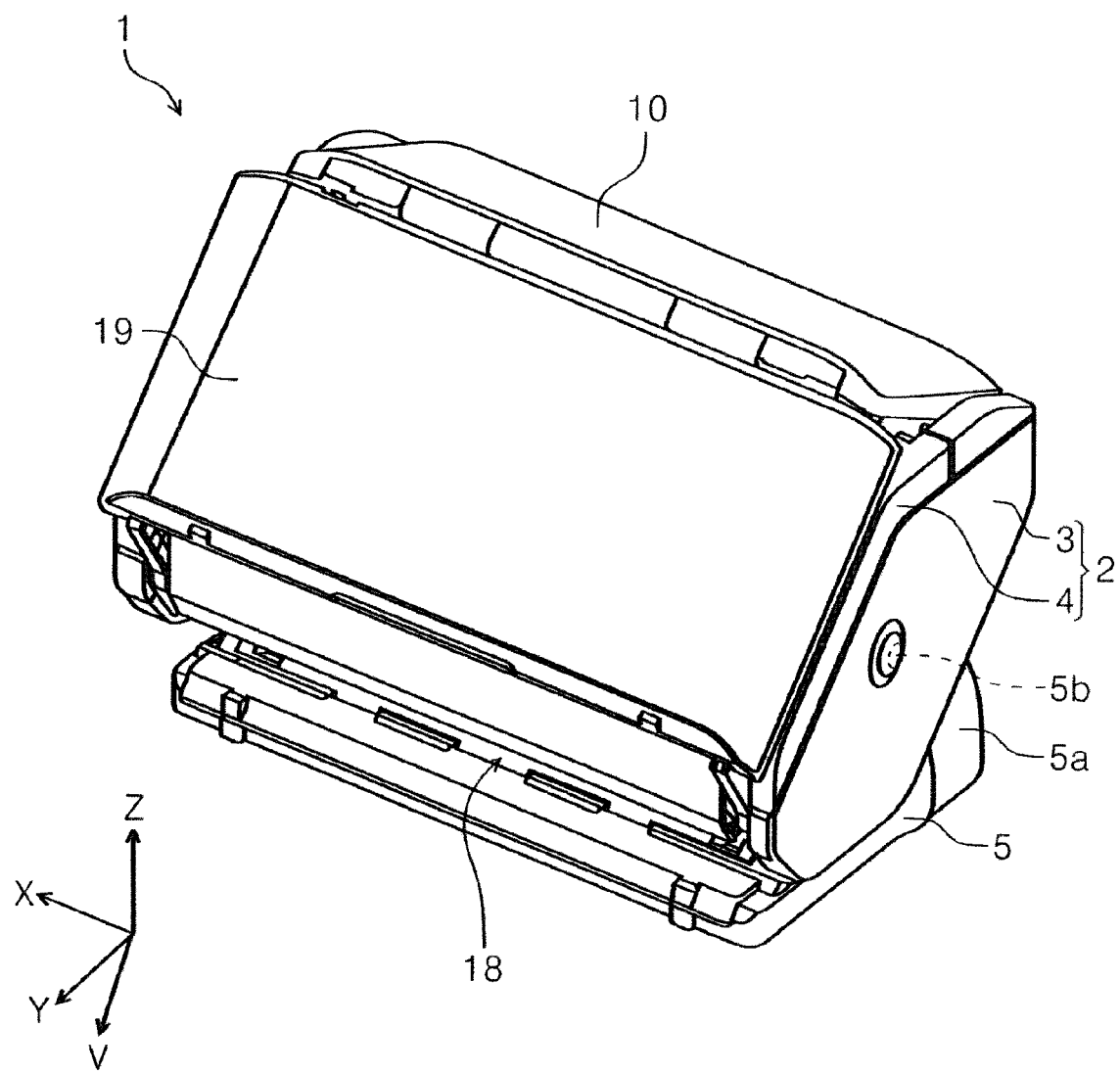
FIG. 1 is an external perspective view of a scanner.

The present disclosure is roughly described below. An image reading apparatus according to a first aspect includes a loading tray on which a document is loaded, a feeding roller configured to be in contact with a first surface of the document that faces the loading tray to feed the document, a separation roller configured to be in contact with a second surface of the document opposite the first surface to pinch the document with the feeding roller for separation, a first sending roller located downstream of the feeding roller on a document transportation route on which the document travels and configured to be in contact with the first surface of the document to send the document downstream on the document transportation route, a read sensor located downstream of the first sending roller on the document transportation route and configured to read the document, and a second sending roller located downstream of the read sensor on the document transportation route on which the document travels and configured to be in contact with the first surface of the document to send the document downstream on the document transportation route. The document transportation route extends obliquely downward from upstream to downstream. A front end of the document is sent downward from a nipping position where the document is pinched between the feeding roller and the separation roller beyond a common tangent line to the first and second sending rollers. A guide surface is disposed downstream of the nipping position on the document transportation route and below the common tangent line. The guide surface allows the front end of the document sent from the nipping position to travel upward and guides the document downstream.

According to the first aspect, the guide surface that allows the front end of the document sent from the nipping position to travel upward and guides the document downstream is disposed downstream of the nipping position where the document is pinched between the feeding roller and the separation roller on the document transportation route and below the common tangent line to the first and second sending rollers. This configuration enables the document to travel downstream without catching at the front end even when the nipping position is set at a position close to or below the common tangent line. Thus, the height of the apparatus is reduced.

In a second aspect according to the first aspect, the nipping position is located below the common tangent line.

According to the second aspect, since the nipping position is located below the common tangent line, the height of the apparatus is effectively reduced.

In a third aspect according to the first or second aspect, the image reading apparatus further includes a follower roller opposed to the first sending roller and configured to pinch the document with the first sending roller. The front end of the document guided upward by the guide surface comes in contact with an outer surface of the follower roller, and a traveling direction of the front end of the document to the follower roller forms an acute angle with a tangent line to the outer surface of the follower roller at a position in contact with the front end of the document.

According to the third aspect, since the traveling direction of the front end of the document to the follower roller forms an acute angle with the tangent line to the outer surface of the follower roller at a position in contact with the front end of the document, the front end of the document is unlikely to come in contact with the outer surface of the follower roller, preventing paper jam.

In a fourth aspect according to any one of the first to third aspects, a common tangent line to the first sending roller and the second sending roller is in contact with an outer surface of the feeding roller.

According to the fourth aspect, since the common tangent line to the first sending roller and the second sending roller is in contact with an outer surface of the feeding roller, the document transportation route extends in a straight line, enabling thick documents and hard paper documents to be reliably transported.

In a fifth aspect according to any one of the first to fourth aspects, the image reading apparatus further includes regulators located upstream of the nipping position and spaced apart from each other in a document width direction intersecting a document transportation direction. The regulators are configured to be in contact with front ends of documents except for at least a document on the bottom among a stack of documents on the loading tray to limit contact of the front ends with the separation roller.

If the front ends of all the documents on the loading tray are in contact with the outer surface of the separation roller, the outer surface of the separation roller is deformed and the separation roller is pressed against the feeding roller. The contact force between the separation roller and the feeding roller may become excessive, causing multiple feed. According to the fifth aspect, the image reading apparatus further includes regulators located upstream of the nipping position and spaced apart from each other in a document width direction intersecting a document transportation direction, and the regulators are configured to be in contact with front ends of documents except for at least a document on the bottom among a stack of documents on the loading tray to limit contact of the front end with the separation roller. This configuration reduces the above-described problem caused when the front end of the stack of documents on the loading tray is in contact with the outer surface of the separation roller.

In a sixth aspect according to the fifth aspect, the regulators are located on both sides of the nipping position in the document width direction and a limiting member includes the regulators, and the limiting member is rotatable when viewed in the document transportation direction.

If the height positions of the regulators, which are located on both sides of the separation roller in the document width direction, differ from each other, the document may be tilted. However, according to the sixth aspect, the regulators are located on both sides of the nipping position in the document width direction and the regulators are included in a limiting member, and the limiting member is rotatable when viewed in the document transportation direction. This reduces variation in height positions of the regulators, which are spaced apart from each other in the document width direction, resulting in a reduction of tilting.

In a seventh aspect according to the sixth aspect, the regulators are movable in a thickness direction of the stack of documents, and the image reading apparatus further includes an operation portion manipulated by a user and a movement convertor configured to convert movement of the operation portion into movement of the regulators.

According to the seventh aspect, since the regulators are movable in a thickness direction of the stack of documents and the image reading apparatus further includes an operation portion manipulated by a user and a movement convertor configured to convert movement of the operation portion into movement of the regulators, the regulators are moved according to the thickness of the stack of documents, enabling proper feeding suitable for the thickness of the stack of documents.

In an eighth aspect according to the seventh aspect, the image reading apparatus further includes a retainer holding the operation portion in a position. The retainer includes an elastic member elastically deformable by application of force from the regulators.

According to the eight aspect, since the retainer holding the operation portion in a position includes the elastic member elastically deformable by application of force from the regulators, the regulators are moved up by elastic force of the elastic member to some extent when a thick document is fed. Thus, the regulators do not apply an excessive load to the document.

The present disclosure is described in detail below. A scanner 1 that reads at least one of front and rear sides of a document is described as an example of the image reading apparatus. The scanner 1 is a document scanner in which a document is read while being moved relative to an image reader.

In the X-Y-Z coordinate in the drawings, the X axis direction corresponds to a width direction of the apparatus or a width direction of a document. The Y axis direction corresponds to a depth direction of the apparatus and extends in a horizontal direction. The Z axis direction corresponds to a vertical direction. The V axis direction is parallel to a document transportation route T, which will be described later. In the drawings, the Y axis is not indicated if unnecessary. In this embodiment, the +Y direction indicates a direction directed from the rear side of the apparatus toward the front side, and the −Y direction indicates a direction directed from the front side of the apparatus toward the rear side. The +X direction indicates the left side and the −X direction indicates the right side of the apparatus viewed from the front side. In the following description, a traveling direction of a document (+V direction) may be referred to as "downstream" and a direction opposite this direction (−V direction) may be referred to as "upstream".

Figure 2:
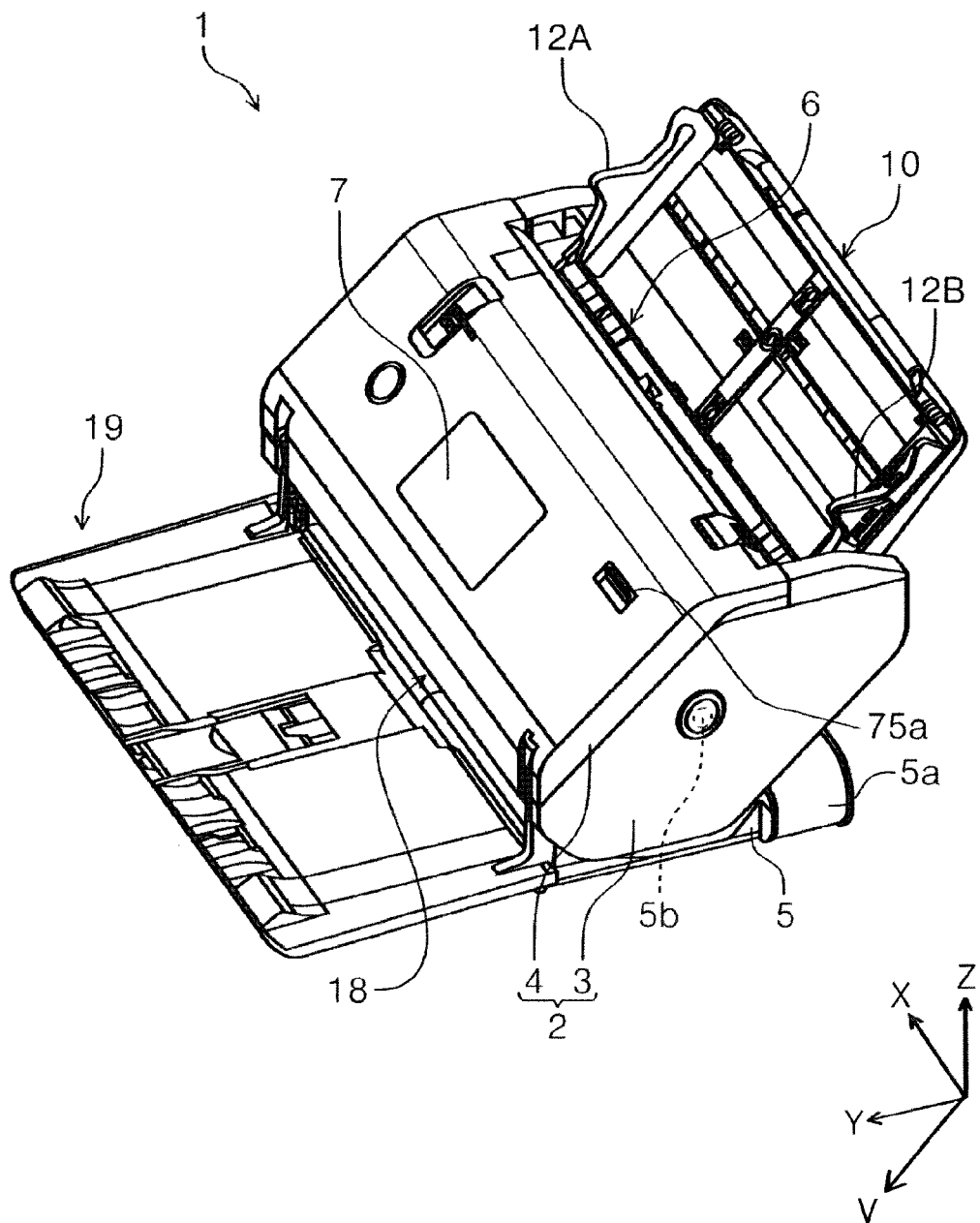
FIG. 2 is an external perspective view of the scanner.
Figure 3:
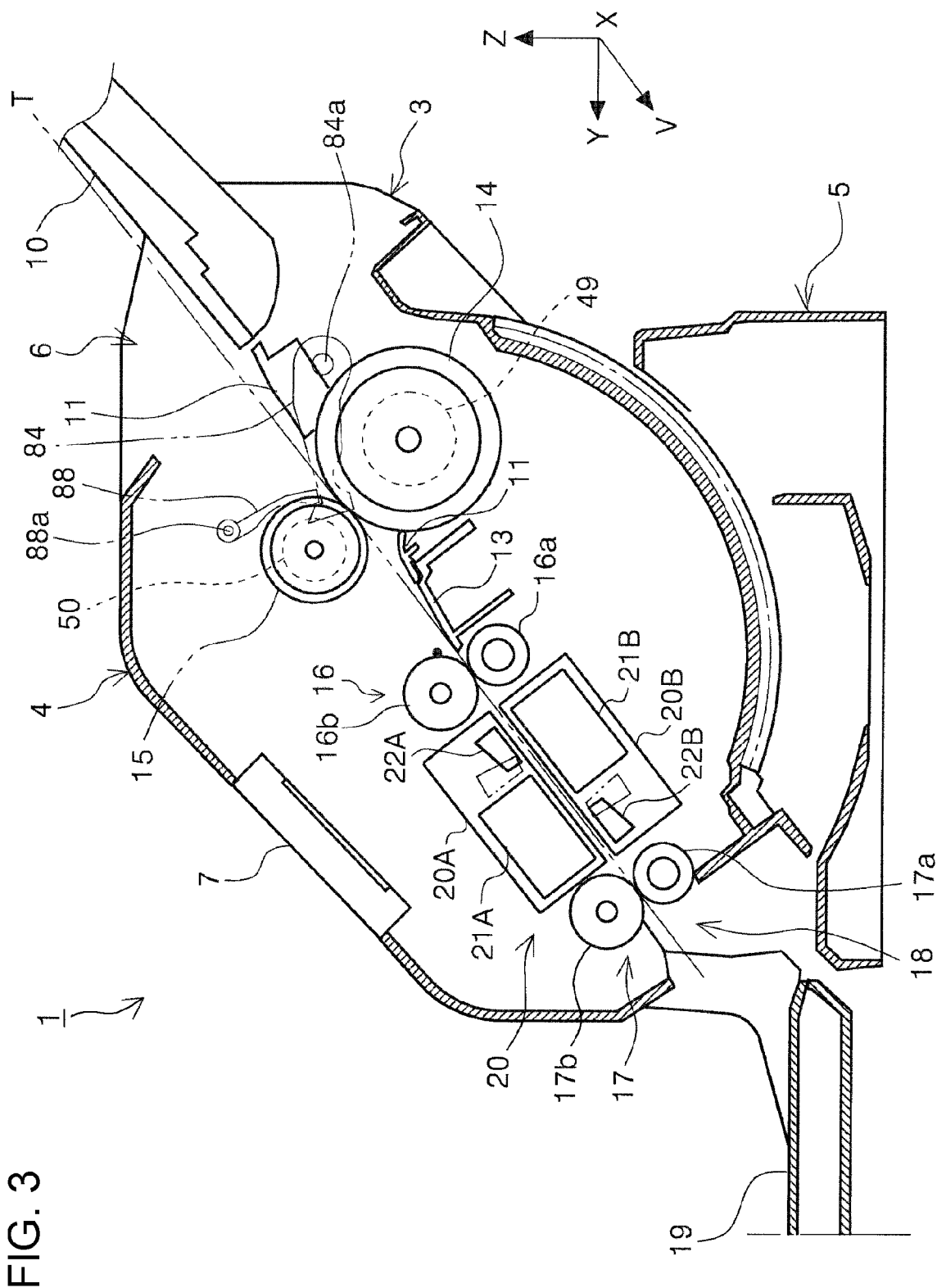
FIG. 3 is a side cross-sectional view of a document transportation route in the scanner.

In FIGS. 1 to 3, the scanner 1 includes a main body 2 and a support 5 that rotatably supports the main body 2. The main body 2 includes a lower unit 3 and an upper unit 4. The upper unit 4 turns relative to the lower unit 3 about a rotation shaft (not illustrated) to be open and closed. When the upper unit 4 is opened to the front side of the apparatus, a document transportation route, which will be described later, is exposed.

The lower unit 3 of the main body 2 is rotatably attached to an arm 5a of the support 5 by using a rotation shaft 5b and the lower unit 3 changes its position when turned. The main body 2 of the scanner 1 according to this embodiment can be held in three positions, including a first position in which the document transportation route T (FIG. 3) is positioned closest to the vertical position, a third position in which the document transportation route T is positioned closest to the horizontal position, and a second position in which the document transportation route T is positioned between the first position and the third position, by a position retaining member (not illustrated). In FIGS. 1 to 3, the main body 2 is in the second position. The main body 2 is in the second or third position when the scanner 1 reads a document and is in the first position when the scanner 1 is not in operation.

A front cover 19 is disposed on the upper unit 4. An upper cover 10 is disposed on the lower unit 3. The front cover 19 is rotatably attached to the upper unit 4. The front cover 19 is turned to be closed as illustrated in FIG. 1 or open as illustrated in FIG. 2. As illustrated in FIGS. 2 and 3, the opened front cover 19 functions as a document receiving tray onto which scanned documents are ejected.

The upper unit 4 includes an operation panel 7 on the upper surface as illustrated in FIG. 2. The operation panel 7 works as a user interface (UI) through which various settings are customized and the scanning operation is executed and that displays the scanning settings. In this embodiment, the operation panel 7 is a touch panel, which displays information and receives input, and functions as both an input device through which various controls are performed and a display that displays various information. The operation panel 7 is exposed when the front cover 19 is opened.

The upper cover 10 on the lower unit 3 is rotatably attached to the lower unit 3. The upper cover 10 is turned to be closed as illustrated in FIG. 1 and open as illustrated in FIGS. 2 and 3 when turned. The opened upper cover 10 functions as a document supporting tray that supports documents to be fed as illustrated in FIGS. 2 and 3. The main body 2 has a feed port 6 opened to the inside of the main body 2 at the upper portion. The documents on the upper cover 10 are sent through the feed port 6 to the inside of the main body 2.

Figure 20:
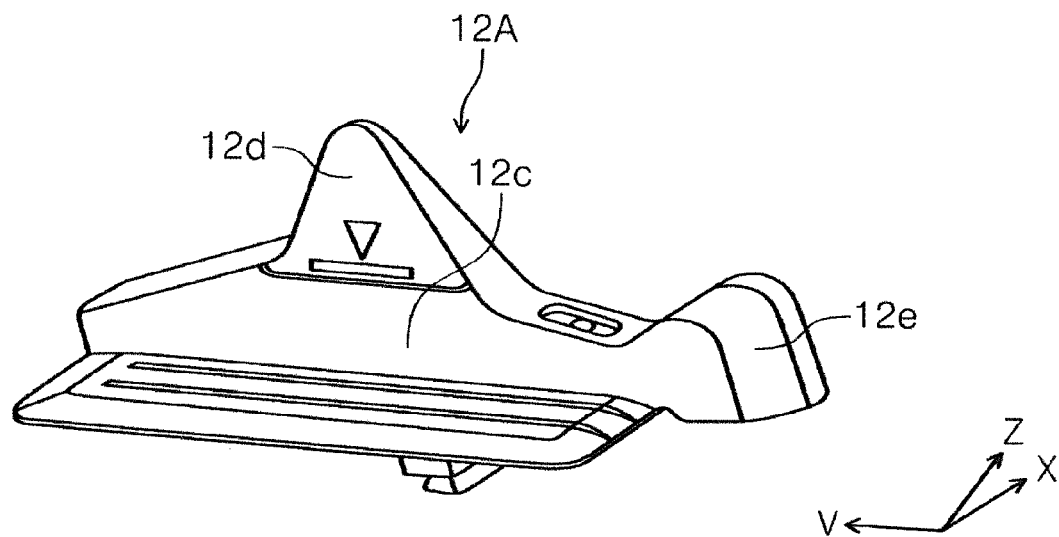
FIG. 20 is a perspective view of an edge guide.
Figure 21:
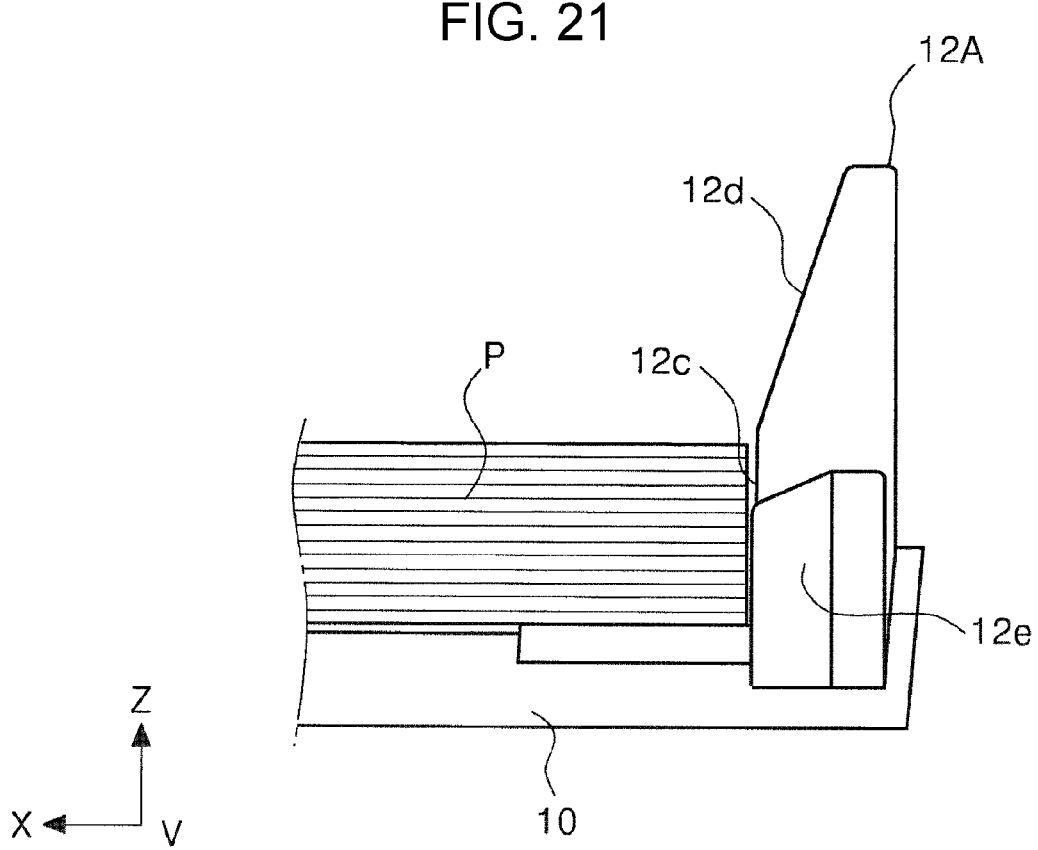
FIG. 21 illustrates the edge guide viewed from upstream in the document transportation direction.

In FIG. 2, the reference numerals 12A and 12B indicate edge guides that guide the document at the edges in the X axis direction. The edge guides 12A and 12B are movable toward or away from each other when one of them is moved through a rack and pinion system (not illustrated). Next, with reference to FIGS. 20 and 21, the shape of the edge guide 12A is described. The shape of the edge guide 12B, which is symmetric to the shape of the edge guide 12A in the X axis direction, is not illustrated and not described in detail.

The edge guide 12A has a guide surface 12c that guides the document at the edge in the X axis direction and has a sloping surface 12d on the +Z side of the guide surface 12c. The sloping surface 12d is tilted toward the +X direction to prevent the edge of the document from catching on the edge guide 12A when the document is loaded on the upper cover 10. Furthermore, the edge guide 12A has a sloping surface 12e on the −V side of the guide surface 12c. The sloping surface 12e is also tilted in the +X direction to prevent the edge of the document from catching on the edge guide 12A when the document is loaded on the upper cover 10.

As illustrated in FIG. 2, the upper unit 4 has an operation portion 75a to be manipulated by a user. The operation portion 75a can be held in three positions, including a neutral position, a forward position, and a backward position. The user is able to change the document feeding condition by controlling the operation portion 75a. This will be described in detail later.

Next, the document transportation route T in the scanner 1 is described with reference mainly to FIG. 3. The document transportation route T extends as illustrated in FIG. 3 when the main body 2 is positioned in the second position. The document transportation route T extends in a substantially straight line between the lower unit 3 and the upper unit 4. The document transportation route T extends obliquely downward from upstream to downstream when the main body 2 is in the second position.

Figure 18:
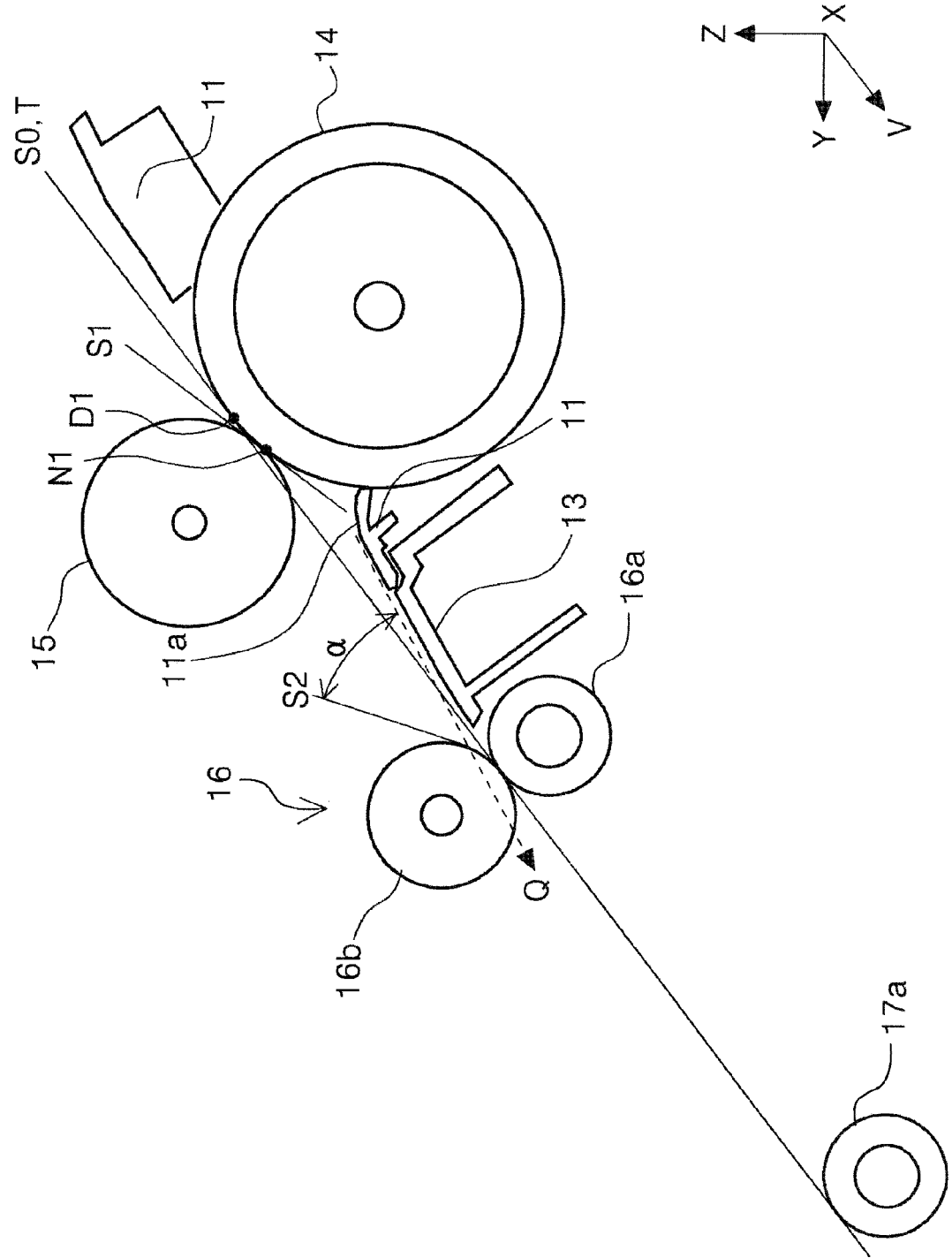
FIG. 18 illustrates a portion of the document transportation route.

The upper cover 10 is located at the most upstream of the document transportation route T. As illustrated in FIG. 18, route forming members 11 and 13 are disposed downstream of the upper cover 10. The route forming member 11 is detachably attached to the route forming member 13. The route forming member 11 forms portions of the route that are located at the middle in the X axis direction and located upstream and downstream of a feeding roller 14 in the V axis direction. In FIG. 3, the feeding roller 14, which sends a document downstream, and the separation roller 15, which pinches the document with the feeding roller 14 for separation, are located downstream of the upper cover 10. The feeding roller 14 comes in contact with a lower surface of the document on the bottom among the documents on the upper cover 10. When multiple documents are loaded on the upper cover 10, the documents are sent downstream in sequence from the document on the bottom. The lower surface of the document on the upper cover 10 is a first surface that faces the upper cover 10 and the surface opposite the lower surface is a second surface. The feeding roller 14 comes in contact with the first surface of the document and the separation roller 15 comes in contact with the second surface of the document.

Figure 4:
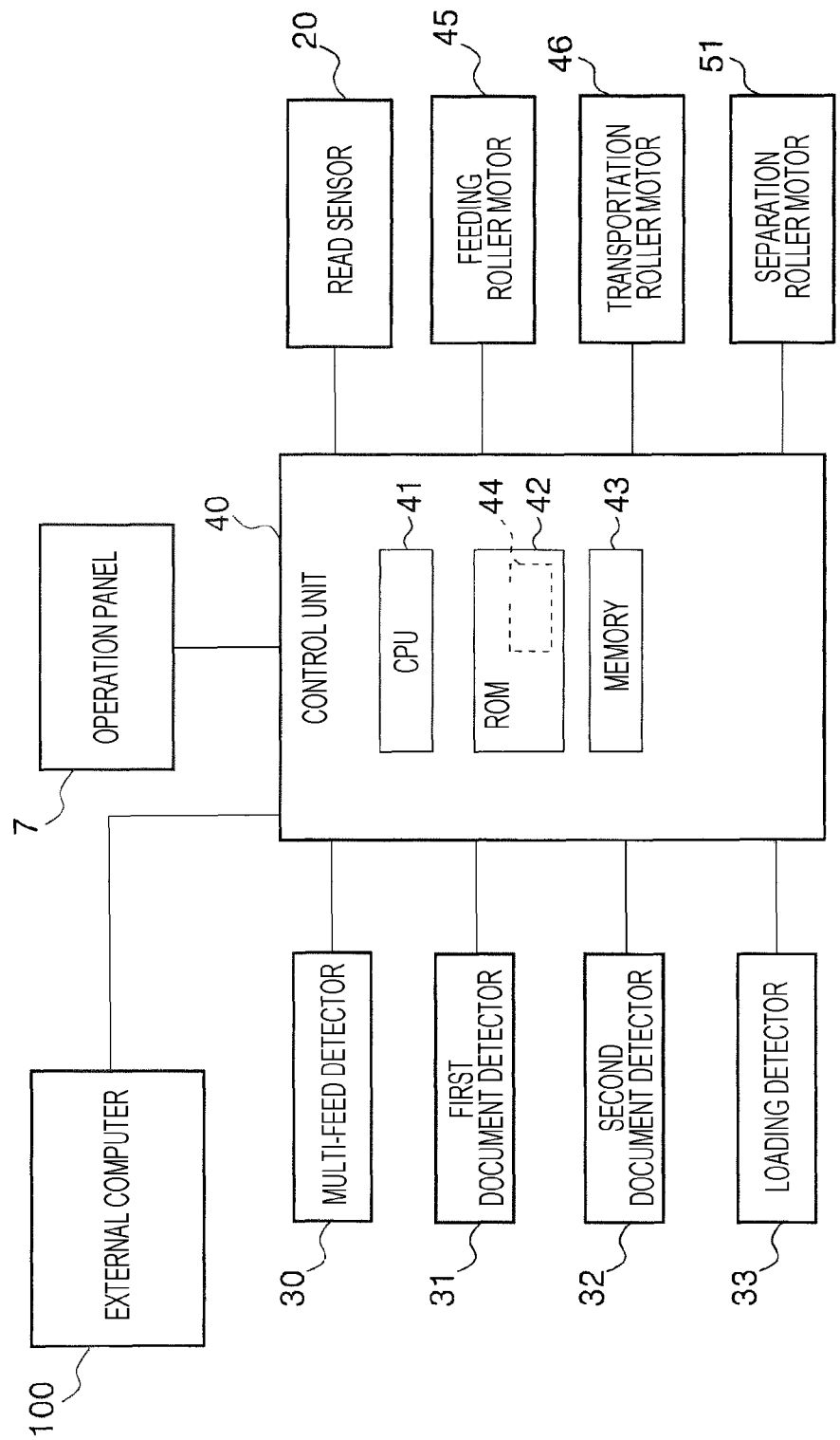
FIG. 4 is a block diagram indicating a control system of the scanner.

The feeding roller 14 is rotated in a counterclockwise direction in FIG. 3 by the rotary torque from a feeding roller motor 45 (FIG. 4). The rotary torque that rotates the separation roller 15 in a counterclockwise direction in FIG. 3 is transmitted from a separation roller motor 51 (FIG. 4) through a torque limiter 50 to the separation roller 15. The feeding roller 14 and the separation roller 15 are described further in detail later.

A pair of transportation rollers 16, an image reader 20 as a read sensor that reads images of documents, and a pair of discharging rollers 17 are located downstream of the feeding roller 14. The pair of transportation rollers 16 includes a transportation drive roller 16a as a first sending roller that is rotated by a transportation roller motor 46 (FIG. 4) and a transportation follower roller 16b that is rotated together with the transportation drive roller 16a. The document pinched between the feeding roller 14 and the separation roller 15 is sent downstream so as to be pinched between the pair of transportation rollers 16 and transported to the position where the document faces an upper sensor unit 20A and a lower sensor unit 20B that are located downstream of the pair of transportation rollers 16.

The image reader 20 includes the upper sensor unit 20A located above the document transportation route T and included in the upper unit 4 and the lower sensor unit 20B located below the document transportation route T and included in the lower unit 3. The upper sensor unit 20A includes a sensor module 21A. The lower sensor unit 20B includes a sensor module 21B. In this embodiment, the sensor modules 21A and 21B are contact read sensor modules (CISM). The sensor module 21A located above the document transportation route T reads the second surface, which is the upper surface of the document. The sensor module 21B located below the document transportation route T reads the first surface, which is the lower surface of the document. The document reading surfaces of the upper and lower sensor units 20A and 20B are parallel to the document transportation route T.

The upper sensor unit 20A includes a background plate 22A opposed to the sensor module 21B of the lower sensor unit 20B. The lower sensor unit 20B includes a background plate 22B opposed to the sensor module 21A of the upper sensor unit 20A. The background plates 22A and 22B are reference plates to be read by the respective opposed sensor modules for shading correction. For example, the background plates 22A and 22B are white, gray or black resin plates or white-colored, gray-colored, or black-colored metal plates.

The background plates 22A and 22B are rotatable by a motor (not illustrated) and turned to face the respective opposed sensor modules as indicated by a solid line or not to face the opposed sensor modules as indicated by a two-dotted chain line. The background plates 22A and 22B are white, for example, and the reference value for white is obtained when the background plates 22A and 22B face the respective opposed sensor modules and the reference value for black is obtained when the background plates 22A and 22B do not face the respective opposed sensor modules.

After at least one of the first and second surfaces of the document is read by the image reader 20, the document is pinched between the pair of discharging rollers 17 located downstream of the image reader 20 and discharged through an outlet 18. The pair of discharging rollers 17 includes a discharging drive roller 17a as a second sending roller that is rotated by the transportation roller motor 46 (FIG. 4) and a discharge follower roller 17b that is rotated together with the discharging drive roller 17a.

Figure 19:
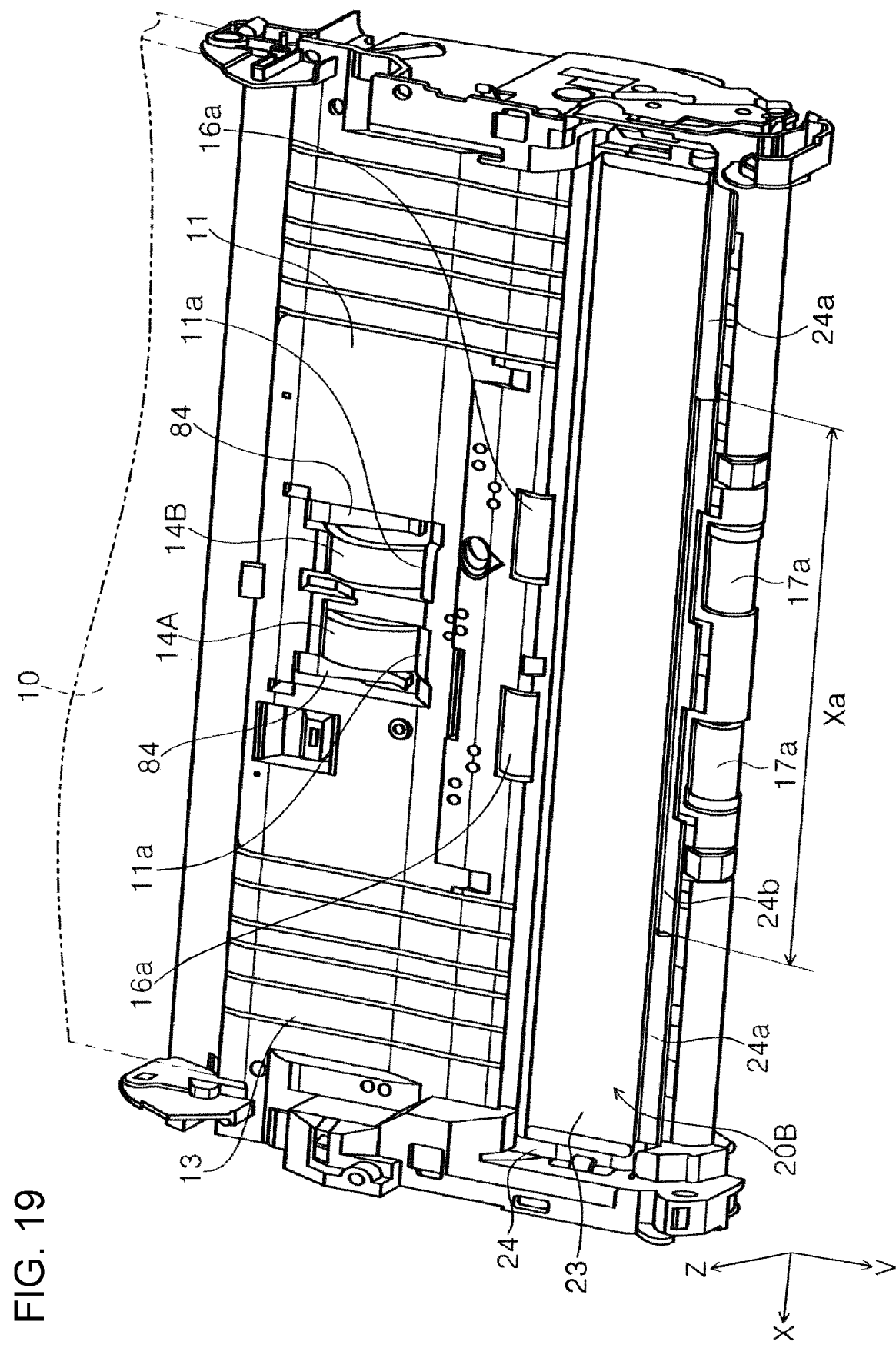
FIG. 19 is a perspective view of a lower unit.
Figure 23:
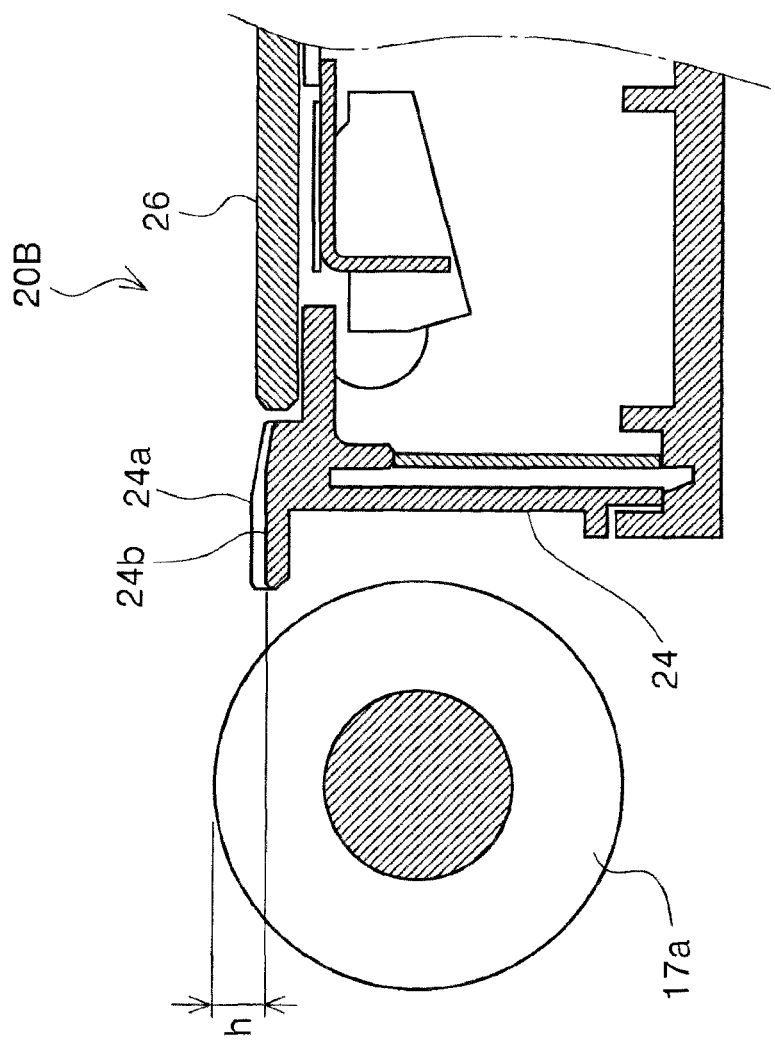
FIG. 23 is a side cross-sectional view illustrating the document transportation route near a discharge drive roller.

Here, the document is guided by first and second guide surfaces 24a and 24b illustrated in FIGS. 19 and 23 to the pair of discharging rollers 17. The first and second guide surfaces 24a and 24b are included in a housing 24 defining an outline of the lower sensor unit 20B. The second guide surface 24b is located below the first guide surface 24a. As illustrated in FIG. 19, the second guide surface 24b extends over a middle area in the X axis direction with a length Xa. The first guide surface 24a is located on both sides of the second guide surface 24b in the X axis direction.

The length Xa is larger than a long side of a card (85.6 mm) defined in ISO/IEC 7810 ID-1, which is an international standard, and is larger than a long side of a passport (125 mm) defined in ISO/IEC 7810 ID-3. Furthermore, the length Xa is smaller than at least a short side of an A4 sheet (210 mm) defined in ISO 216, which is an international standard. The design value of the length Xa may be 177 mm. Furthermore, in FIG. 23, the distance h between the nipping position of the pair of discharging rollers 17 and the second guide surface 24b in the height direction is larger than the thickness of embossed characters (0.36 to 0.46 mm) on a card defined in ISO/IEC 7810 ID-1, which is an international standard. When a card or a passport having embossed characters is a document to be transported, this configuration allows the document to be smoothly pinched between the discharging rollers 17.

Hereinafter, a control system of the scanner 1 is described with reference to FIG. 4. A control unit 40 as a controller controls various functions of the scanner 1, including document feeding, transportation, and discharging, and image reading. The control unit 40 receives signals from the operation panel 7 and also sends signals for controlling display of the operation panel 7 to the operation panel 7.

The control unit 40 controls driving sources, such as the feeding roller motor 45, the separation roller motor 51, and the transportation roller motor 46. The control unit 40 receives read data from the image reader 20 and also sends signals for controlling the image reader 20 to the image reader 20. The control unit 40 receives signals from detectors, such as a multi-feed detector 30, a first document detector 31, a second document detector 32, and a loading detector 33.

The control unit 40 includes a CPU 41, a ROM 42, and a memory 43. The CPU 41 performs arithmetic operations in accordance with a program 44 stored in the ROM 42 to control the entire action of the scanner 1. The memory 43, which is an example of a storage device, is a read-write non-volatile memory. All the necessary parameters for various controls are stored in the memory 43 and the values are updated by the control unit 40 as necessary. The scanner 1 is connectable to an external computer 100 from which information is sent to the control unit 40.

The control unit 40 receives detection signals from the detectors on the document transportation route T. The loading detector 33 is a detector on the route forming member 11 (FIG. 3). The control unit 40 determines the presence or absence of a document on the upper cover 10 by using the signal from the loading detector 33. The first document detector 31 is a detector located between the feeding roller 14 (FIG. 3) and the pair of transportation rollers 16 (FIG. 3). The control unit 40 detects the passage of the front end or rear end of the document by using a signal from the first document detector 31.

The multi-feed detector 30 is a detector located between the feeding roller 14 (FIG. 3) and the pair of transportation rollers 16 (FIG. 3) and includes an ultrasonic generator and an ultrasonic receiver, which face each other with the document transportation route T therebetween. The control unit 40 detects the multiple feed by using a signal from the multi-feed detector 30.

The second document detector 32 is a detector located between the pair of transportation rollers 16 (FIG. 3) and the image reader 20 (FIG. 3). The control unit 40 detects the passage of the front end or rear end of the document by using a signal from the second document detector 32.

Figure 8:
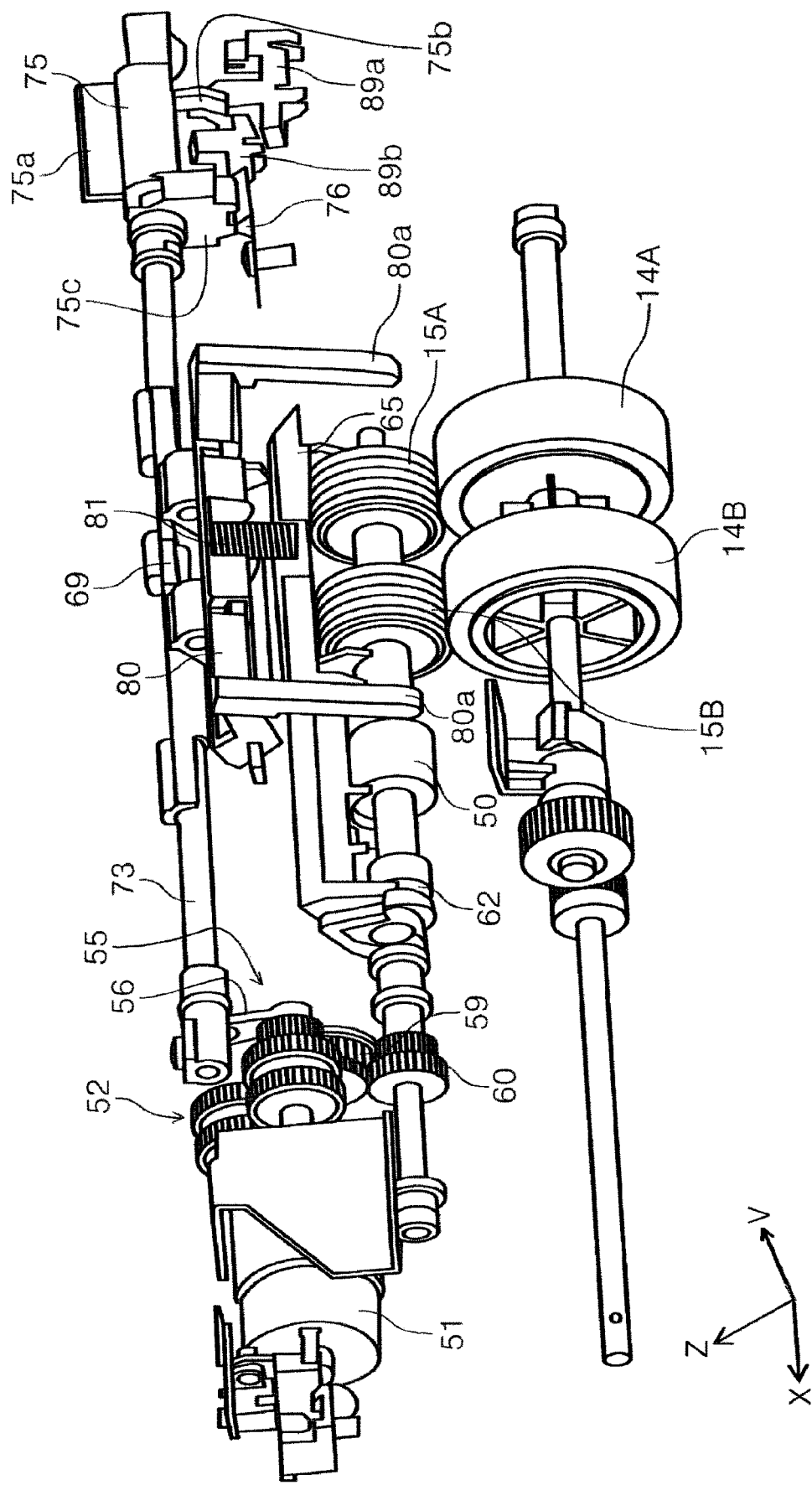
FIG. 8 is a perspective view of a feeding roller, the separation roller, and regulators.
Figure 9:
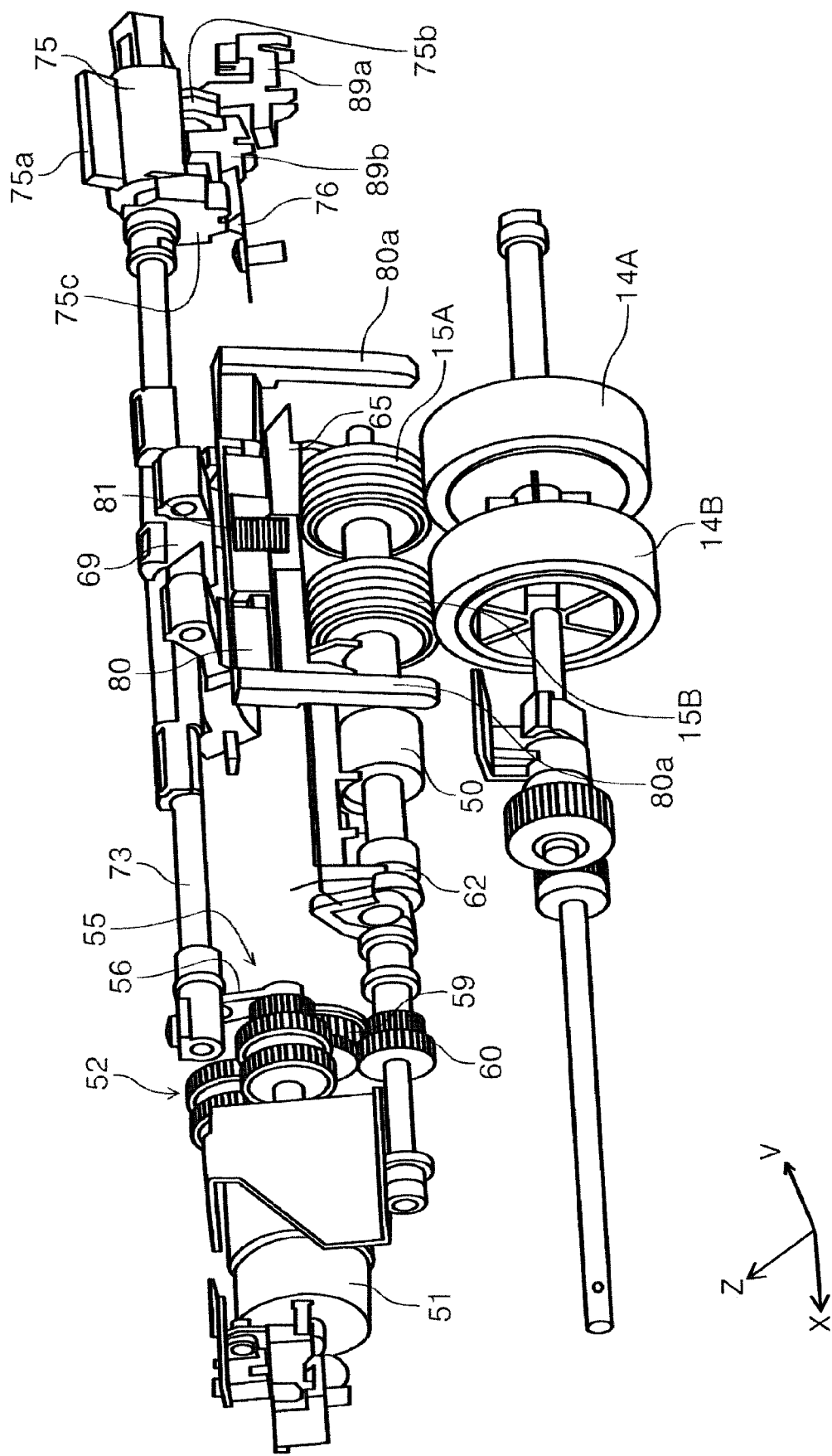
FIG. 9 is a perspective view of the feeding roller, the separation roller, and the regulators.

Next, the feeding roller 14 and the separation roller 15 are described in detail with reference to FIG. 5 and the subsequent figures. In this embodiment, as illustrated in FIGS. 8 and 9, two feeding rollers 14 are spaced apart from each other in the document width direction. In FIGS. 8 and 9, one of the feeding rollers has the reference numeral 14A and the other has the reference numeral 14B. The feeding rollers 14A and 14B are arranged symmetrically about the center of the document in the document width direction. Similarly, two separation rollers 15 are spaced apart from each other in the document width direction. In FIGS. 8 and 9, one of the separation rollers has the reference numeral 15A and the other has the reference numeral 15B. The separation rollers 15A and 15B are also arranged symmetrically about the center of the document in the document width direction. In the following description, when the feeding rollers 14A and 14B do not need to be distinguished from each other, they are simply referred to as the feeding roller 14. Similarly, when the separation rollers 15A and 15B do not need to be distinguished from each other, they are simply referred to as the separation roller 15.

The driving force from the feeding roller motor 45 (FIG. 4) is transmitted through a one-way clutch 49 (FIG. 3) to the feeding roller 14. The feeding roller 14 rotates in a counterclockwise direction in FIG. 3 to send the document downstream upon receiving the rotary torque from the feeding roller motor 45. In the following description, the rotation direction of the feeding roller 14 in which the document is sent downstream by the feeding roller 14 is referred to as a normal rotation direction and the direction opposite the normal rotation direction is referred to as a reverse rotation direction. Similarly, the rotation direction of the feeding roller motor 45 in which the document is sent downstream is referred to as a normal rotation direction and the direction opposite the normal rotation direction is referred to as a reverse rotation direction.

The one-way clutch 49 disposed on the driving force path from the feeding roller motor 45 to the feeding roller 14 does not allow the feeding roller 14 to rotate in the reverse rotation direction if the feeding roller motor 45 is reversed. Furthermore, when the feeding roller motor 45 is stopped, the feeding roller 14 in contact with the document to be transported is rotated in the normal rotation direction. For example, when the front end of the document is detected by the second document detector 32, which is located downstream of the pair of transportation rollers 16, the control unit 40 stops the feeding roller motor 45 and activates only the transportation roller motor 46. Thus, the document is transported by the pair of transportation rollers 16, and the feeding roller 14 is rotated in the normal rotation direction by the document in contact with the feeding roller 14.

Next, the separation roller 15 receives rotary torque from the separation roller motor 51 (FIG. 4) through the torque limiter 50. The driving force path from the separation roller motor 51 to the separation roller 15 is described in detail later.

When no document or only one page of document is positioned between the feeding roller 14 and the separation roller 15, the rotary torque to rotate the separation roller 15 in the normal rotation direction exceeds the limit torque, which is the upper limit torque for the torque limiter 50. In such a case, slippage occurs in the torque limiter 50, allowing the separation roller 15 to rotate or spin in the normal rotation direction regardless of the rotary torque from the separation roller motor 51. In the following description, a direction in which the separation roller 15 is rotated along with the rotation of the feeding roller 14 or by the document being transported is referred to as a normal rotation direction and a direction opposite the normal rotation direction is referred to as a reverse rotation direction. Similarly, a rotation direction in which the separation roller motor 51 rotates to rotate the separation roller 15 in the normal rotation direction is referred to as a normal rotation direction and a direction opposite the normal rotation direction is referred to as a reverse rotation direction. During transportation of a document, the separation roller motor 51 generally reversely rotates, i.e., generates driving torque that reversely rotates the separation roller 15.

Next, if the subsequent page of the document enters a space between the feeding roller 14 and the separation roller 15 in addition to the document to be fed, the documents slip against each other. Thus, the separation roller 15 is reversely rotated by the driving torque from the separation roller motor 51. This returns the subsequent page of the document upstream and prevents multiple feed.

The feeding roller 14 and the separation roller 15 each have an outer surface formed of an elastic material such as an elastomer. The relationship of $\mu 1 > \mu 2$, the relationship of $\mu 1 > \mu 3, \mu 4$, the relationship of $\mu 2 < \mu 3, \mu 4$, and the relationship of $\mu 4 > \mu 3$ are satisfied, in which $\mu 1$ is a coefficient of friction between the feeding roller 14 and the separation roller 15, $\mu 2$ is a coefficient of friction between the documents, $\mu 3$ is a coefficient of friction between the feeding roller 14 and the document, and $\mu 4$ is a coefficient of friction between the separation roller 15 and the document.

Next, the driving force path from the separation roller motor 51 to the separation roller 15 is described. In FIG. 5, the driving force generated by the separation roller motor 51 is transmitted through a set of gears 52 to a switch unit 55. The switch unit 55 includes a transmission gear 59 which may be selectively in or out of mesh with a driven gear 60.

Figure 13:
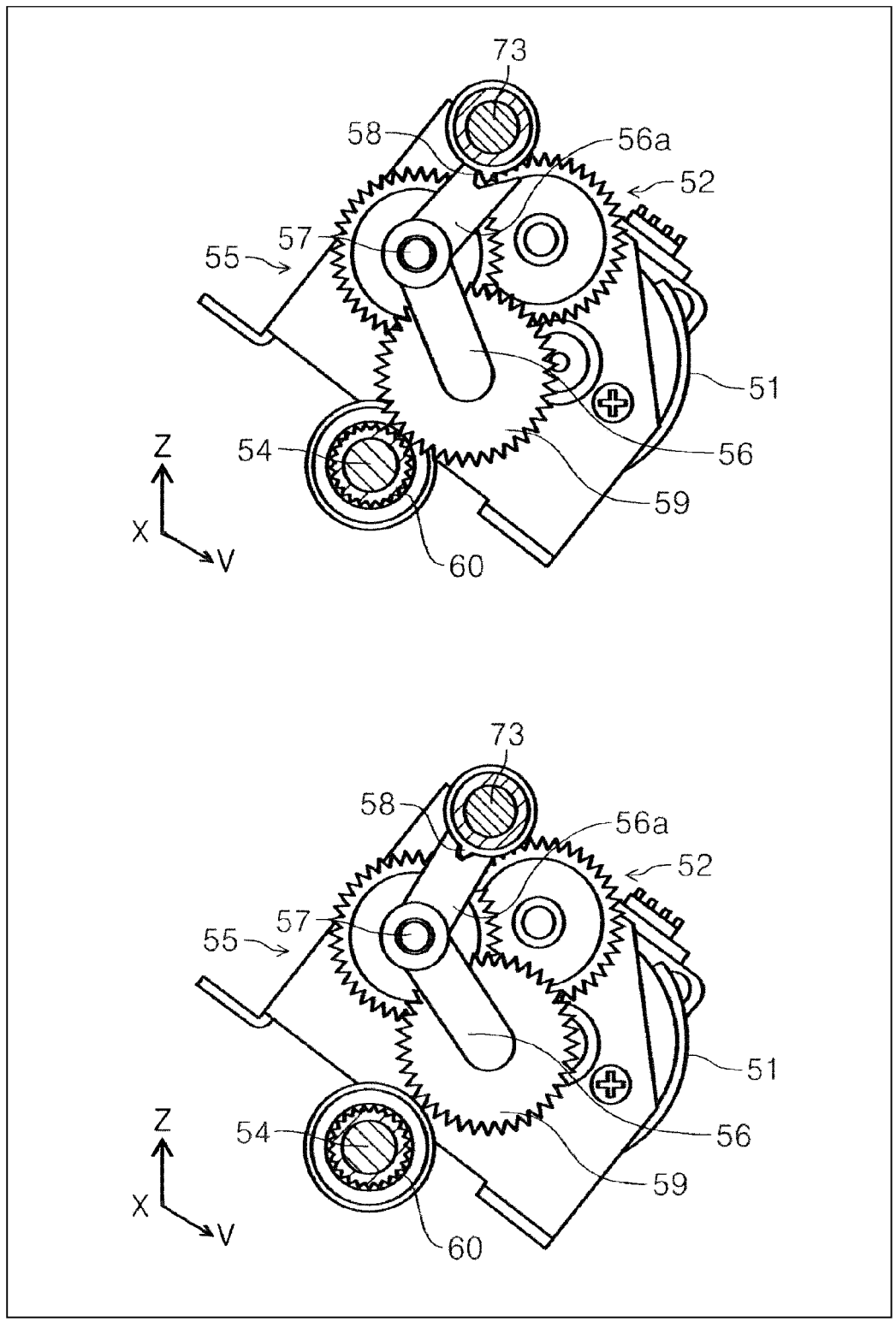
FIG. 13 includes cross-sectional views taken along line XIII-XIII in FIG. 5 and illustrates states in which the operation portion is in different positions.

More specifically described, as illustrated in FIG. 13, the transmission gear 59 is attached to an arm 56. The arm 56 is attached to a shaft 57 in a swingable manner. The arm 56 has first and second sections extending from the shaft 57 in different directions. The transmission gear 59 is attached to one end of the first section of the arm 56 extending in a first direction. The second section of the arm 56 extending in a second direction functions as a cam follower 56a. The cam follower 56a engages with a cam 58, and the cam 58 allows the cam follower 56a or the arm 56 to swing.

The cam 58 is attached to one end of a shaft 73. An operation member 75 is attached to the other end of the shaft 73. The operation member 75 has the operation portion 75a, which was described with reference to FIG. 1. In this configuration, when the operation portion 75a is manipulated, the shaft 73 is rotated, the cam 58 is rotated, and then the arm 56 is swung. In other words, the transmission gear 59 is placed in or out of mesh with the driven gear 60 by the manipulation of the operation portion 75a, allowing switching between a first state in which the separation roller motor 51 is connected to the separation roller 15 by the driving force path and a second state in which the driving force path is cut off.

Figure 5:
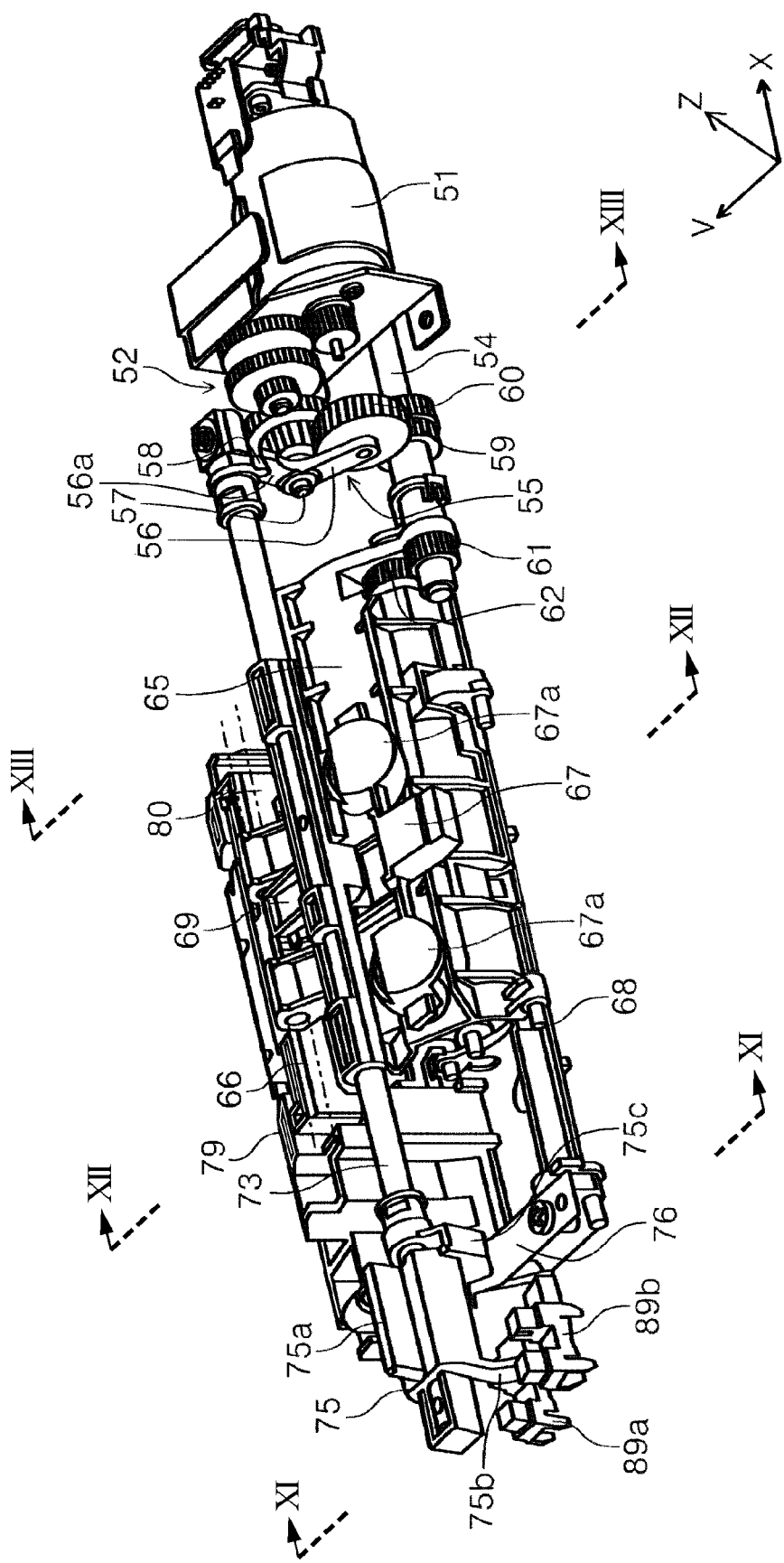
FIG. 5 is a perspective view of components around a separation roller.
Figure 11:
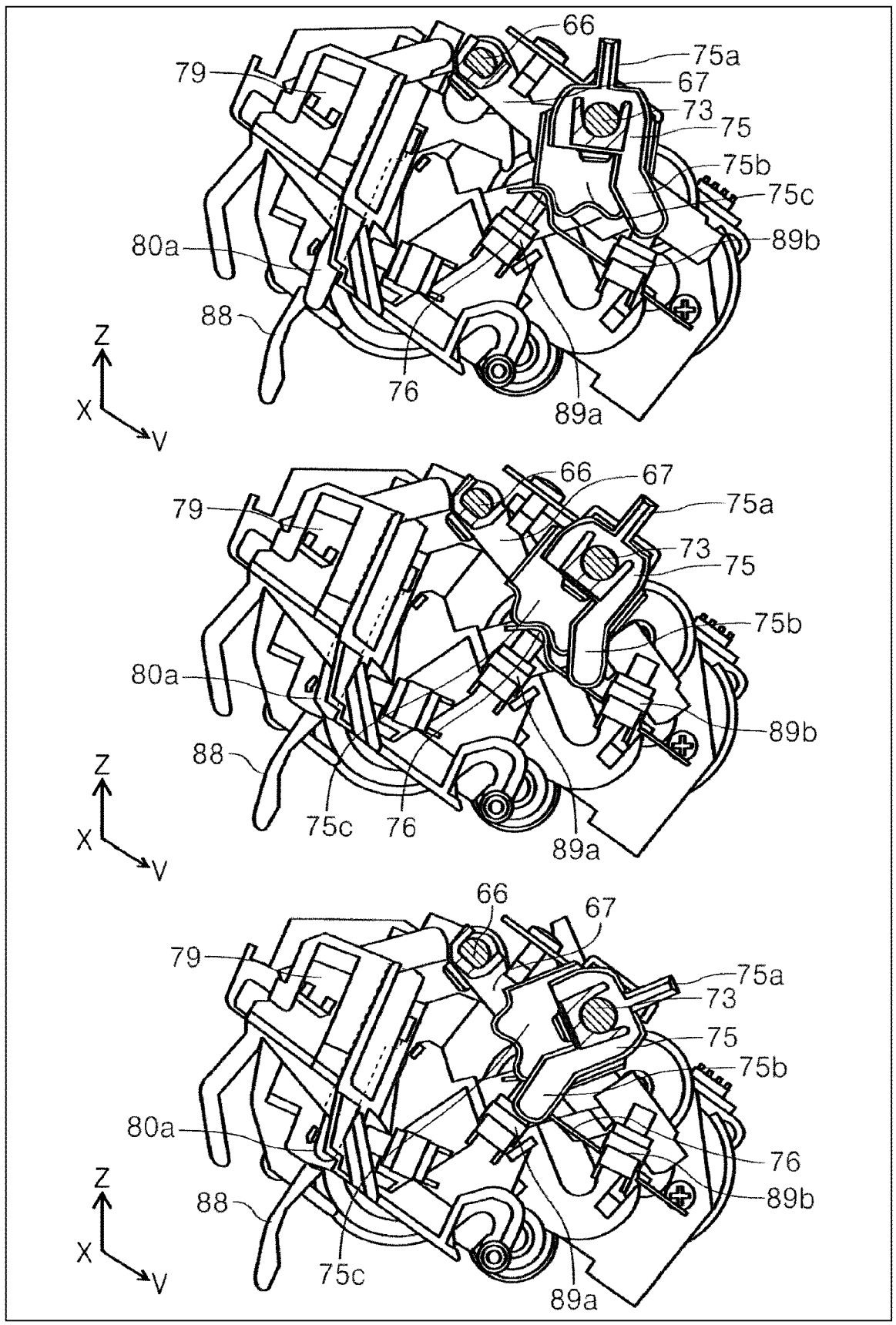
FIG. 11 includes cross-sectional views taken along line XI-XI in FIG. 5 and illustrates states in which an operation portion is in different positions.

As illustrated in FIGS. 5 and 11, the operation member 75 includes a detection object 75b and a hooked portion 75c. Position sensors 89a and 89b, which are optical sensors, are disposed on the turning trajectory of the detection object 75b turned together with the operation member 75. The control unit 40 (FIG. 4) determines the position of the operation member 75 by using the combination of detection signals from the position sensors 89a and 89b.

Furthermore, the hooked portion 75c engages with a leaf spring 76. As illustrated in FIG. 11, the hooked portion 75c has a recess in a surface facing the leaf spring 76. When the leaf spring 76 is caught in the recess, the operation member 75 is positionally fixed. The leaf spring 76 constitutes a retainer that holds the operation member 75 in a position.

Figure 7:
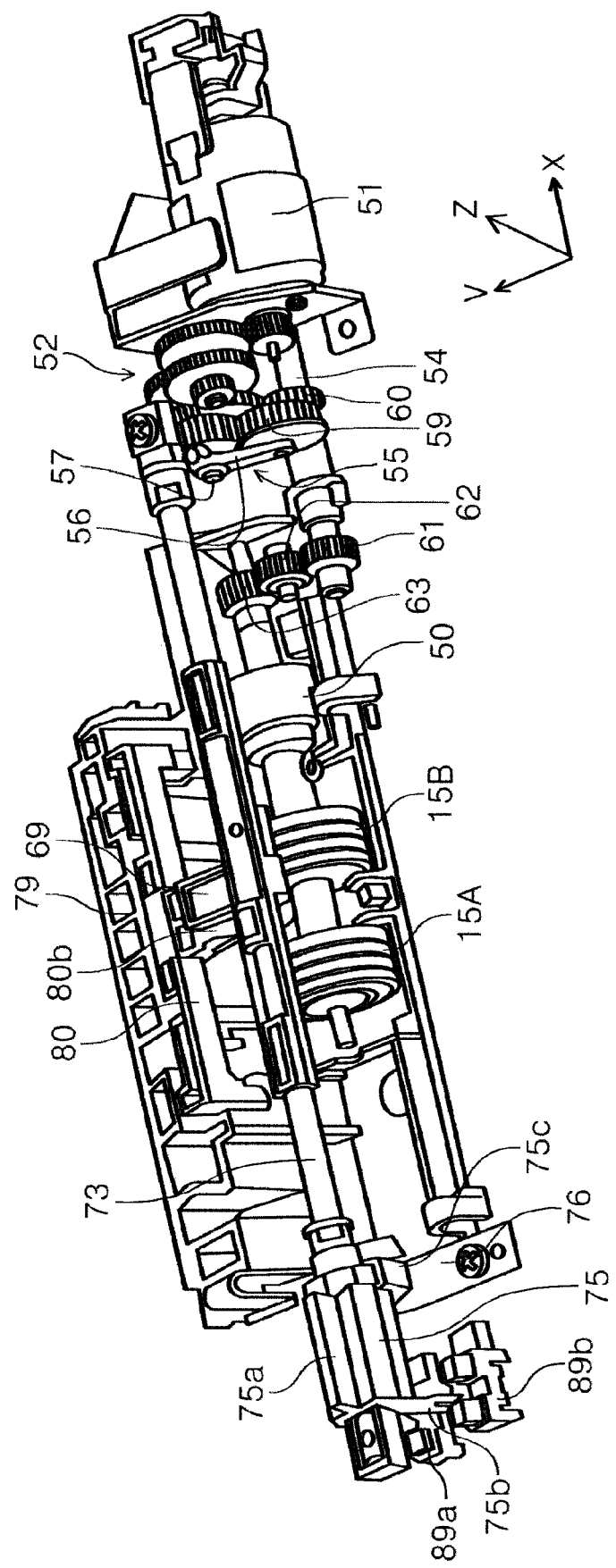
FIG. 7 is a perspective view of components around the separation roller.

Next, as illustrated in FIG. 5, the driven gear 60 is attached to a shaft 54, and the shaft 54 has a gear 61 meshed with a gear 62. As illustrated in FIG. 7, the gear 62 is meshed with a gear 63 that transmits driving force to the torque limiter 50.

With reference to FIGS. 11 and 13, the relationship between the manipulation of the operation portion 75a and the meshing between the transmission gear 59 and the driven gear 60 is described. The operation portion 75a may be in a first position illustrated in the middle figure in FIG. 11, a second position illustrated in the upper figure in FIG. 11, and a third position illustrated in the lower figure in FIG. 11. The upper figure in FIG. 13 corresponds to the middle figure in FIG. 11 in which the operation portion 75a is in the first position. In this state, the cam 58 does not engage with the cam follower 56a, and the transmission gear 59 is meshed with the driven gear 60, and thus the switch unit 55 is in the first state in which the driving force is transmittable from the separation roller motor 51 to the separation roller 15. The lower figure in FIG. 13 corresponds to the lower figure in FIG. 11 in which the operation portion 75a is in the third position. In this state, the cam 58 engages with the cam follower 56a, and the transmission gear 59 is away from the driven gear 60, and thus the switch unit 55 is in the second state in which the driving force is not transmittable from the separation roller motor 51 to the separation roller 15. When the position of the operation portion 75a is changed from the first position to the second position illustrated in the upper figure in FIG. 11, the cam 58 in the upper figure in FIG. 13 turns in a counterclockwise direction in FIG. 13. Thus, the cam 58 still does not engage with the cam follower 56a, and thus the switch unit 55 keeps in the first state in which the driving force is transmittable from the separation roller motor 51 to the separation roller 15.

When the switch unit 55 is in the second state in which the driving force is not transmittable from the separation roller motor 51 to the separation roller 15, the separation roller 15 is not rotated in the reverse rotation direction and is freely rotatable. In other words, when the switch unit 55 is in the second state in which the driving force is transmittable from the separation roller motor 51 to the separation roller 15, the separation roller 15 does not separate the documents. Hereinafter, the document feeding in such a state is referred to as a "non-separation mode". The document feeding with document separation by the separation roller 15 is referred to as a "separation mode".

Next, a switch unit for changing the amount of pressure applied from the separation roller 15 to the feeding roller 14 is described. The separation roller 15 is supported by a separation roller holder 65 illustrated in FIGS. 5 and 12. The separation roller holder 65 is swingable about a shaft 68 to move the separation roller 15 toward and away from the feeding roller 14. The shaft 68 is coaxial with the shaft 54.

A spring retainer 67 is disposed above the separation roller holder 65. The spring retainer 67 includes two spring retaining portions 67a. A spring 64 (FIG. 12), which is an example of a pressing member, is disposed between the spring retainer 67a and the separation roller holder 65. The spring 64 biases the separation roller holder 65 or the separation roller 15 toward the feeding roller 14. The spring retainer 67 is swingable about a shaft 66.

Figure 12:
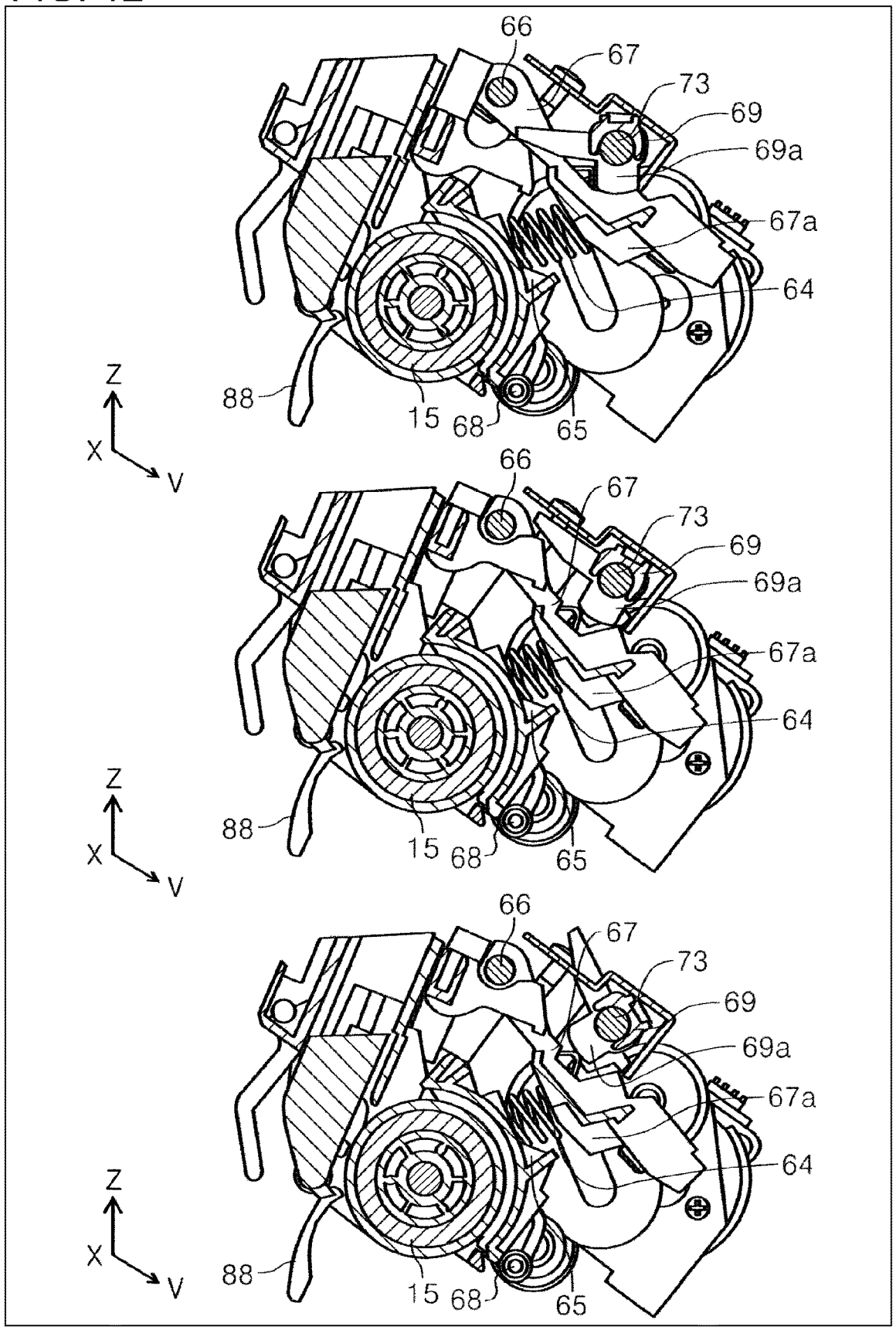
FIG. 12 includes cross-sectional views taken along line XII-XII in FIG. 5 and illustrates states in which the operation portion is in different positions.

A cam 69 is disposed above the spring retainer 67. The cam 69 is on the shaft 73, which is turned by the operation portion 75a, and is turned through the manipulation of the operation portion 75a. As illustrated in FIG. 12, the cam 69 includes a cam portion 69a that engages with the spring retainer 67.

In the middle figure in FIG. 12, the operation portion 75a is in the first position (the middle figure in FIG. 11). In this state, the cam portion 69a presses down the spring retainer 67, and thus the spring 64 is compressed or shortened to apply a predetermined pressure to the separation roller holder 65. In this embodiment, the spring 64 may be in one of two lengths. Hereinafter, the lengths are simply referred to as "short" and "long".

In the lower figure in FIG. 12, the operation portion 75a is in the third position (the lower figure in FIG. 11). In this state, as in the middle figure in FIG. 12, the cam portion 69a presses down the spring retainer 67, and the length of the spring 64 is short. In other words, the pressure that presses the separation roller 15 against the feeding roller 14 while the operation portion 75a is in the first position is the same as that while the operation portion 75a is in the third position.

In the upper figure in FIG. 12, the operation portion 75a is in the second position (the upper figure in FIG. 11). The cam portion 69a in this state presses down the retainer 67 less than the cam portion 69a in the above-described two states in which the operation portion 75a is in the first position or in the third position. Thus, the spring 64 is longer than that in the above-described two states, lowering the pressure that presses the separation roller 15 against the feeding roller 14. This weakens the separation action to separate documents by the separation roller 15. Hereinafter, this state or the document feeding in the state illustrated in the upper figure in FIG. 12 is referred to as a "soft separation mode". Furthermore, the document feeding in the state illustrated in the middle figure in FIG. 12 is referred to as a "normal separation mode".

The above-described configurations are summarized as follows. The position of the operation portion 75a is switchable among the first position illustrated in the middle figure in FIG. 11, the second position illustrated in the upper figure in FIG. 11, and the third position illustrated in the lower figure in FIG. 11. When the operation portion 75a is in the first position, the switch unit 55 (FIG. 13) is in the first state in which the driving force is transmittable from the separation roller motor 51 to the separation roller 15 and documents are fed in the separation mode in which the separation roller 15 separates the documents. The separation mode is a normal separation mode (the middle figure in FIG. 12) in which the pressure that presses the separation roller 15 against the feeding roller 14 is normal. When the operation portion 75a is in the second position, the switch unit 55 (FIG. 13) is in the first state in which the driving force is transmittable from the separation roller motor 51 to the separation roller 15 and documents are fed in the separation mode in which the separation roller 15 separates the documents. The separation mode is the soft separation mode (the upper figure in FIG. 12) in which the pressure that presses the separation roller 15 against the feeding roller 14 is smaller than that in the normal separation mode. When the operation portion 75a is in the third position, the switch unit 55 (FIG. 13) is in the second state in which the driving force is not transmittable from the separation roller motor 51 to the separation roller 15 and documents are fed in the non-separation mode in which the separation roller 15 does not separate the documents. The pressure that presses the separation roller 15 against the feeding roller 14 in this mode is the same as that in the normal separation mode.

Next, the regulator that limits the contact between front ends of the documents and the separation roller 15 is described. In this embodiment, the feeding roller 14 is in contact with the document on the bottom among the stack of documents to be fed. The stack of documents on the upper cover 10 (FIG. 3) that is in contact with the outer surface of the separation roller 15 at the front end deforms the outer surface of the separation roller 15 and generates a force that presses the separation roller 15 against the feeding roller. The separation roller 15 is pressed against the feeding roller 14 by such a force in addition to the pressure applied by the spring 64 (FIG. 12) that presses the separation roller 15 against the feeding roller 14. Thus, the contact force between the separation roller 15 and the feeding roller may become excessive, resulting in multiple feed. To overcome this problem, the regulator that limits the contact between the front ends of the documents and the separation roller 15 is disposed in this embodiment.

More specifically described, as illustrated in FIG. 7, the regulating member 80 is slidably attached to a frame 79. The regulating member 80 slides substantially in the same direction as the thickness direction of the stack of documents. As illustrated in FIGS. 8 and 9, the regulating member 80 includes two regulators 80a. The regulating member 80 includes a regulation object 80b that is pressed by a spring 81 in an upward direction or in a direction in which the regulators 80a are away from the document transportation route. The upward movement of the regulation object 80b is limited by the cam 69 illustrated in FIG. 7.

The cam 69 is attached to the shaft 73 that is turned by the above-described manipulation of the operation portion 75a. When the shaft 73 is turned, the cam 69 presses down the regulating member 80. FIGS. 8 and 9 illustrate how the cam 69 presses down the regulating member 80. As can be seen from the above, the cam 69, the spring 81, and the shaft 73 constitute a movement convertor that converts the movement of the operation portion 75a into the movement of the regulators 80a.

In the relationship between the position of the operation portion 75a and the regulators 80a, when the operation portion 75a is in the first position (the middle figure in FIG. 11), the regulators 80a are positioned highest. In other words, in the normal separation mode, the regulators 80a are positioned high. In this embodiment, the regulators 80a are positioned one of a high position and a low position. Hereinafter, the two positions are simply referred to as "high" and "low". When the operation portion 75a is in the second position (the upper figure in FIG. 11), the regulators 80a are positioned low. In other words, in the soft-separation mode, the regulators 80a are positioned low. When the operation portion 75a is in the third position (the lower figure in FIG. 11), the regulators 80a are positioned high. In other words, in the non-separation mode, the regulators 80a are positioned high. Table 1 indicates the relationship between the position of the operation portion 75a and the separation mode.

TABLE 1

| Operation portion | Separation mode | Separation roller driving force | Separation roller pressure | Regulators |
|---|---|---|---|---|
| First position (neutral position) | normal separation mode | transmittable | strong | high |
| Second position (tilted backward) | soft separation mode | transmittable | weak | low |
| Third position (tilted forward) | non-separation mode | not transmittable | strong | high |

Figure 10:
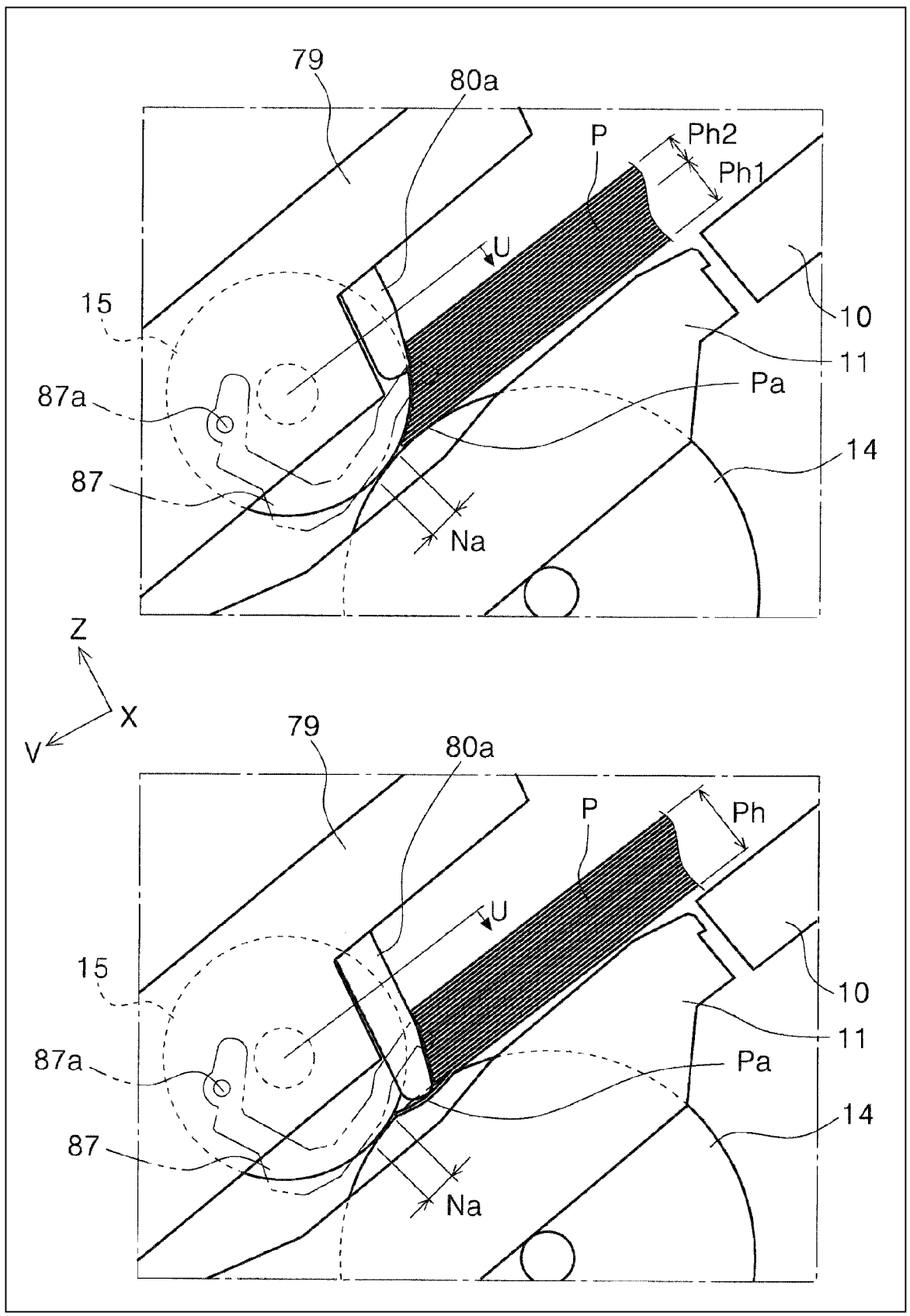
FIG. 10 includes side views of the regulator.

Subsequently, the operation of the regulators 80a is described with reference to FIG. 10. As illustrated in the upper figure in FIG. 10, the front ends of the documents on the upper cover 10 are in contact with the outer surface of the separation roller 15 with the limiter 80a being positioned highest. In such a case, the outer surface of the separation roller 15 is deformed and the separation roller 15 is pressed against the feeding roller 14. The contact force between the separation roller 15 and the feeding roller 14 may become excessive, causing multiple feed. The front ends of the documents in contact with the outer surface of the separation roller 15 press the separation roller 15 against the feeding roller 14 when the front ends of the documents are positioned in an area U below the center of rotation of the separation roller 15.

The regulators 80a limit the number of documents in contact with the outer surface of the separation roller 15. In FIG. 10, a region indicated by Na is the nipping region where a document is pinched between the separation roller 15 and the feeding roller 14. In this embodiment, the regulators 80a are positioned upstream of the nipping region Na and are spaced apart from each other in the document width direction as illustrated in FIGS. 8 and 9. The regulators 80a are in contact with the front ends of the documents except for at least a document on the bottom Pa among a stack of documents P to regulate the contact between the front ends and the separation roller 15. With this configuration, the contact force between the separation roller 15 and the feeding roller 14 does not become excessive, preventing the multiple feed.

In view of quality of paper on the market, the coefficient of friction between thin sheets of paper is higher than that between thick sheets of paper. The multiple feed problem is more likely to occur when the documents are thin. To overcome this problem, when the documents are thin sheets, the operation portion 75a (for example, FIGS. 1 and 5) is positioned in the second position such that documents are fed in the soft-separation mode. This moves the regulators 80a down to the lowest position as illustrated in the lower figure in FIG. 10, preventing most of the documents of the stack of documents P from coming in contact with the separation roller 15. This prevents the above-described multiple feed problem. In this state, the front end (lower end) of the limiter 80*a* overlaps the feeding roller 14 in side view of the transportation route. However, since the documents are thin, the document on the bottom Pa is able to bend and pass under the limiter 80*a* as illustrated in the lower figure in FIG. 10 to the nipping region Na where the document is pinched between the feeding roller 14 and the separation roller 15. In the soft separation mode, the pressure that presses the separation roller 15 against the feeding roller 14 is weak, preventing the front end of the thin document from being turned up.

When the documents are thick sheets, the operation portion 75*a* (for example, FIGS. 2 and 5) are positioned in the first position such that documents are fed in the normal separation mode. This moves the regulators 80*a* up to the high position as illustrated in the upper figure in FIG. 10, preventing the upper documents Ph2 of the stack of documents P from coming in contact with the separation roller 15 and allowing only the lower documents Ph1 to come in contact with the separation roller 15. This also prevents the above-described multiple feed problem. In this state, the front end of the limiter 80*a* does not overlap the feeding roller 14 in side view of the document transportation route.

Documents are required to be fed while being stacked on top of each other in some cases, such as a case in which the stack of documents is a booklet. In such cases, the separation by the separation roller 15 may cause paper jam. To overcome the problem, the operation portion 75*a* (for example, FIGS. 2 and 5) is positioned in the third position such that documents are fed in the non-separation mode. In this mode, the separation roller 15 does not separate the documents, preventing the paper jam during feeding of the booklet, for example.

Figure 17:
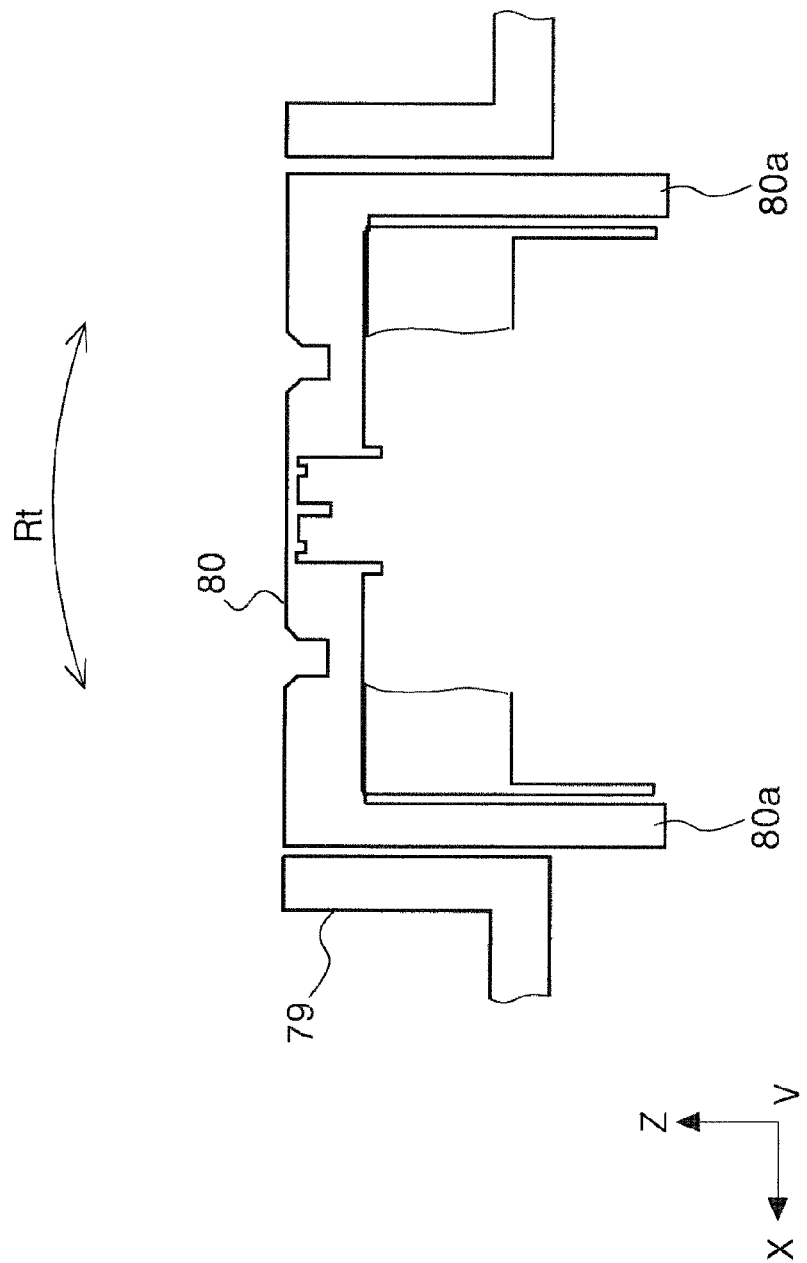
FIG. 17 is a front view of a regulating member.

The regulating member 80 including the two limiting portions 80*a* is attached to the frame 79 in FIG. 7 in a slidable manner in the thickness direction of the documents with a clearance between the regulating member 80 and the frame 79 in the X axis direction. Thus, the regulating member 80 is able to turn a little as indicated by an arrow Rt in FIG. 17. This configuration provides the following operational advantages. If the regulating member 80 is unable to turn in the direction indicated by the arrow Rt relative to the frame 79, the positions of the two regulators 80*a* in the height direction or the amounts of protrusion relative to the documents would be varied in some cases due to a manufacturing error. In such cases, the loads applied to the documents passing under the two regulators 80*a* may be varied between the left regulator 80*a* and the right regulator 80*a*, causing skew. However, in this embodiment, the regulating member 80 is slightly turnable in the direction indicated by the arrow Rt in FIG. 17. This balances the protrusion amounts of the two regulators 80*a* relative to the documents, reducing or preventing the skew.

When the documents to be fed is thick, the regulators 80*a* may apply a large load to the documents. However, in this embodiment, the regulating member 80 is able to be moved up to some extent by the elastic force of the leaf spring 76, which was described with reference to FIG. 11. Thus, the regulators 80*a* do not apply a large load to the thick documents to be fed.

Figure 6:
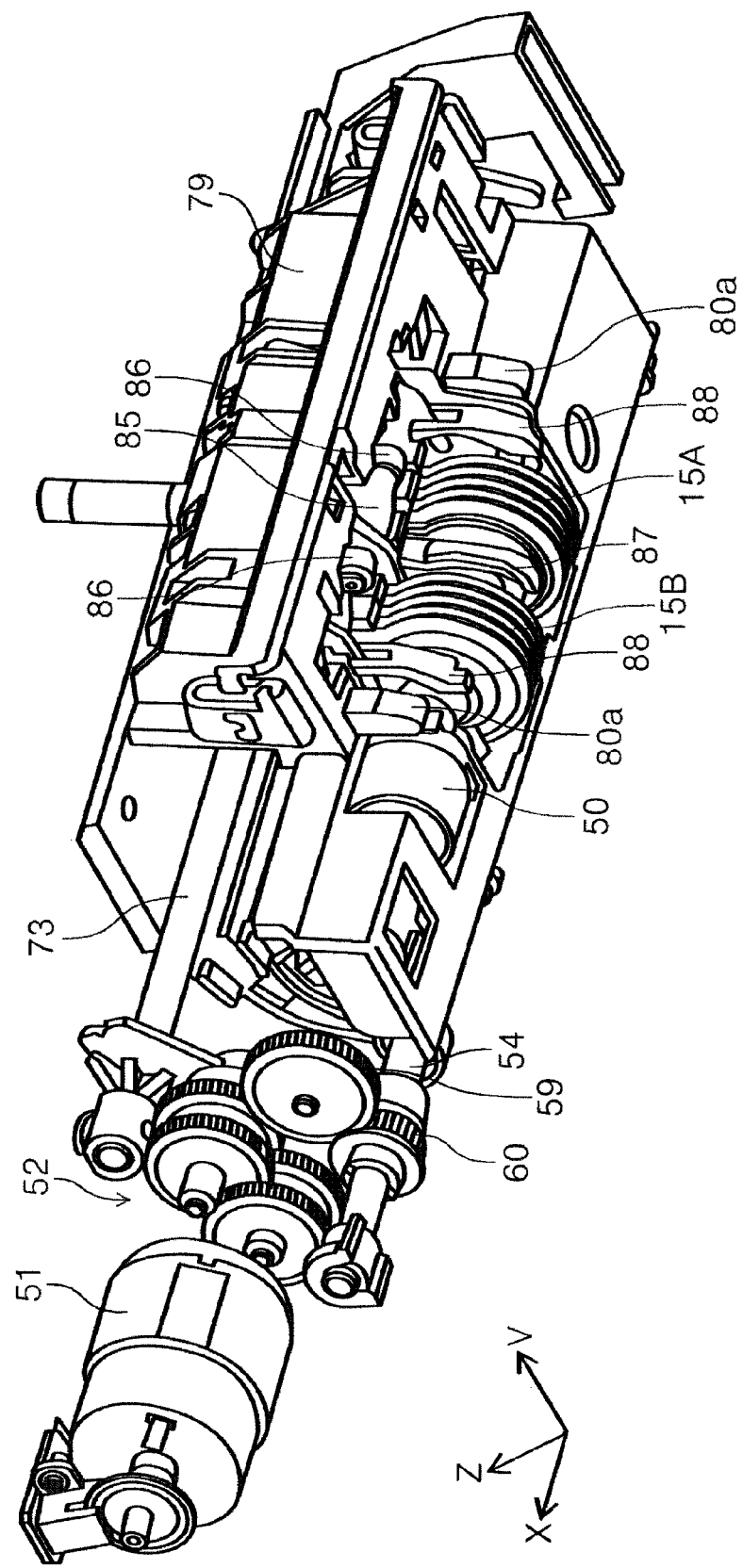
FIG. 6 is a perspective view of components around the separation roller.

Next, as illustrated in FIG. 6, a strength imparting member 87 is disposed between the separation rollers 15A and 15B in the width direction of the document. The strength imparting member 87 is swingable about a swing shaft 87*a* illustrated in FIG. 10 and is biased by a spring, which is an example of a pressing member (not illustrated), toward the document transportation route. Thus, the document to be fed is deformed to have a wave-like pattern in the width direction, improving the strength of the document in the feeding direction of the document. This prevents the paper jam.

In FIG. 6, components indicated by the reference numeral 88 are flaps. As illustrated in FIG. 3, before the feeding operation, the flaps 88 are located upstream of the regulators 80*a* and prevent documents loaded on the upper cover 10 from coming in contact with the separation rollers 15. The flaps 88 are rotatable about a rotation shaft 88*a* and the lower ends engage with a set guide 84 before the feeding operation so as not to rotate in the clockwise direction in FIG. 3. When the feeding operation starts, the set guide 84 starts to rotate about a rotation shaft 84*a* in the counterclockwise direction in FIG. 3. This allows the flaps 88 to rotate and the front end of the stack of documents on the upper cover 10 to come in contact with the separation rollers 15.

Here, as described with reference to FIG. 12, the separation roller 15 is supported by the separation roller holder 65 and the separation roller holder 65, which is swingable about the shaft 68, presses the separation roller 15 toward the feeding roller 14 by using the spring 64. The force to pinch the document between the feeding roller 14 and the separation roller 15 is a separation load. The separation ability increases as the separation load increases. The separation load is constituted by a spring force exerted by the spring 64 and the force to bite into the feeding roller 14 exerted by the separation roller 15 rotated by the feeding roller 14. The biting force varies depending on the position of the shaft 68 of the separation roller holder 65.

Figure 22:
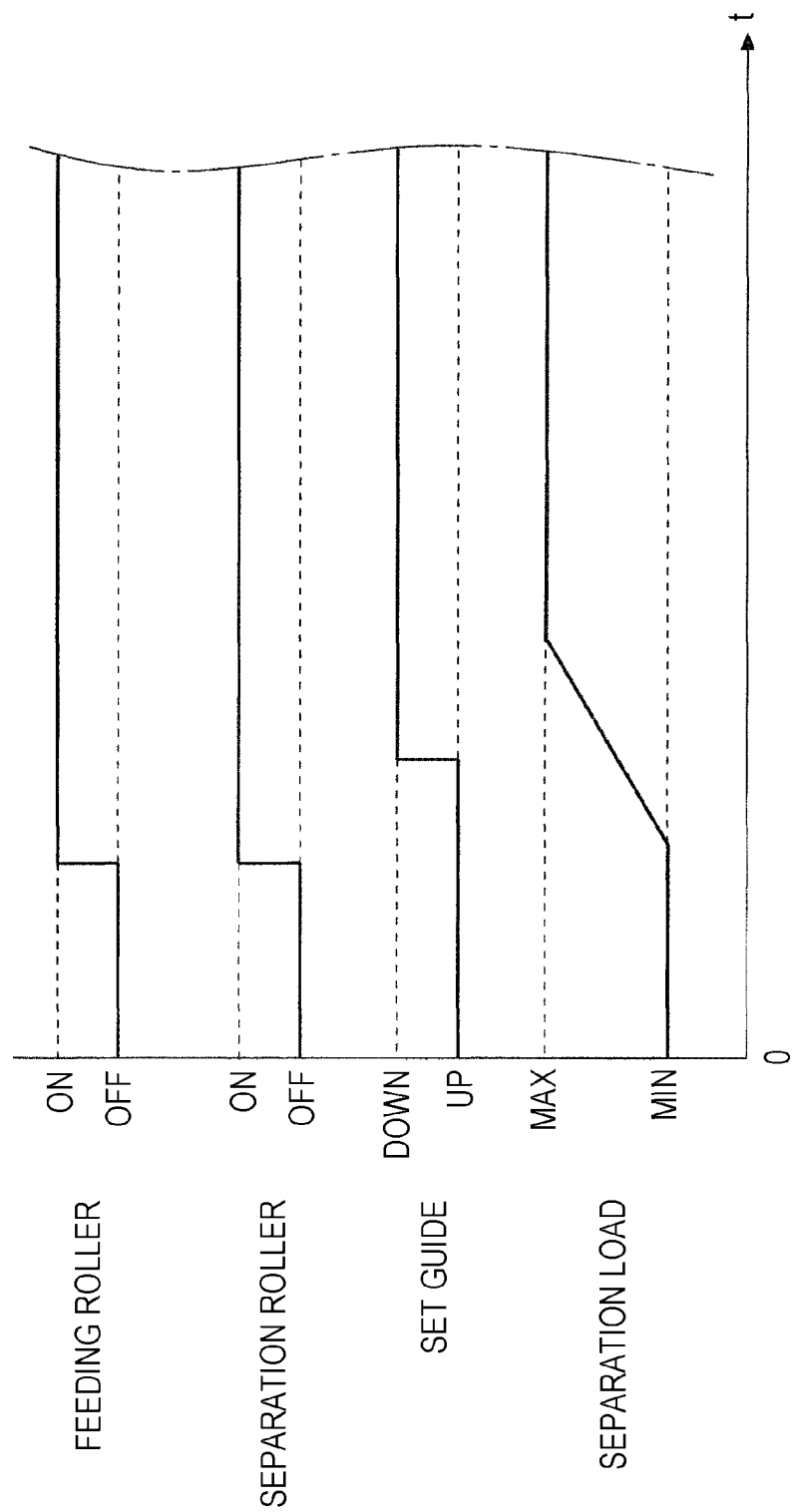
FIG. 22 is a timing diagram of feed control.

However, the biting force does not reach the maximum value at the start of the rotation of the feeding roller motor 45 (FIG. 4) and the separation roller motor 51 (FIG. 4). There is a time lag between when the rotation starts and when the biting force reaches the maximum value, for example, due to backlash between the gears on the driving force paths from the motors to the rollers. As indicated in FIG. 22, it takes some time before the separation load reaches the maximum value after the start of rotation of the motors. If the set guide 84 is moved down to allow the front end of the stack of documents to be in contact with the separation roller 15 before the separation load reaches a predetermined value, multiple feed may occur due to the insufficient separation load. To solve the problem, as indicated in FIG. 22, the set guide 84 is moved down after a lapse of a predetermined period of time from the start of rotation of the feeding roller motor 45 (FIG. 4) and the separation roller motor 51 (FIG. 4). This prevents the multiple feed caused by the insufficient separation load. In FIG. 22, the start timing of descent of the set guide 84 is set slightly before the separation load reaches the maximum, because it takes some time before the front end of the stack of documents actually comes in contact with the separation roller 15 after the start of descent of the set guide 84. However, the set guide 84 may start to move down at the same time as when the separation load reaches the maximum value or after the separation load reaches the maximum value.

Next, as illustrated in FIGS. 6 and 14 to 16, a hold-down member 85 is disposed above a front end of the document on the upper cover 10. The hold-down member 85 is movable in a front/rear direction relative to the feeding roller 14 and is pressed toward the document by a pressing member, which will be described later, to press a portion of the document on the upper cover 10 near the front end. More specifically described, as illustrated in the right figures in FIGS. 14, 15, and 16, the hold-down member 85 pinches the document with the feeding roller 14. The hold-down member 85 includes a follower roller 86 to be in contact with the document such that the document to be fed does not receive a transportation load particularly when only one page of document is loaded on the upper cover 10.

Figure 14:
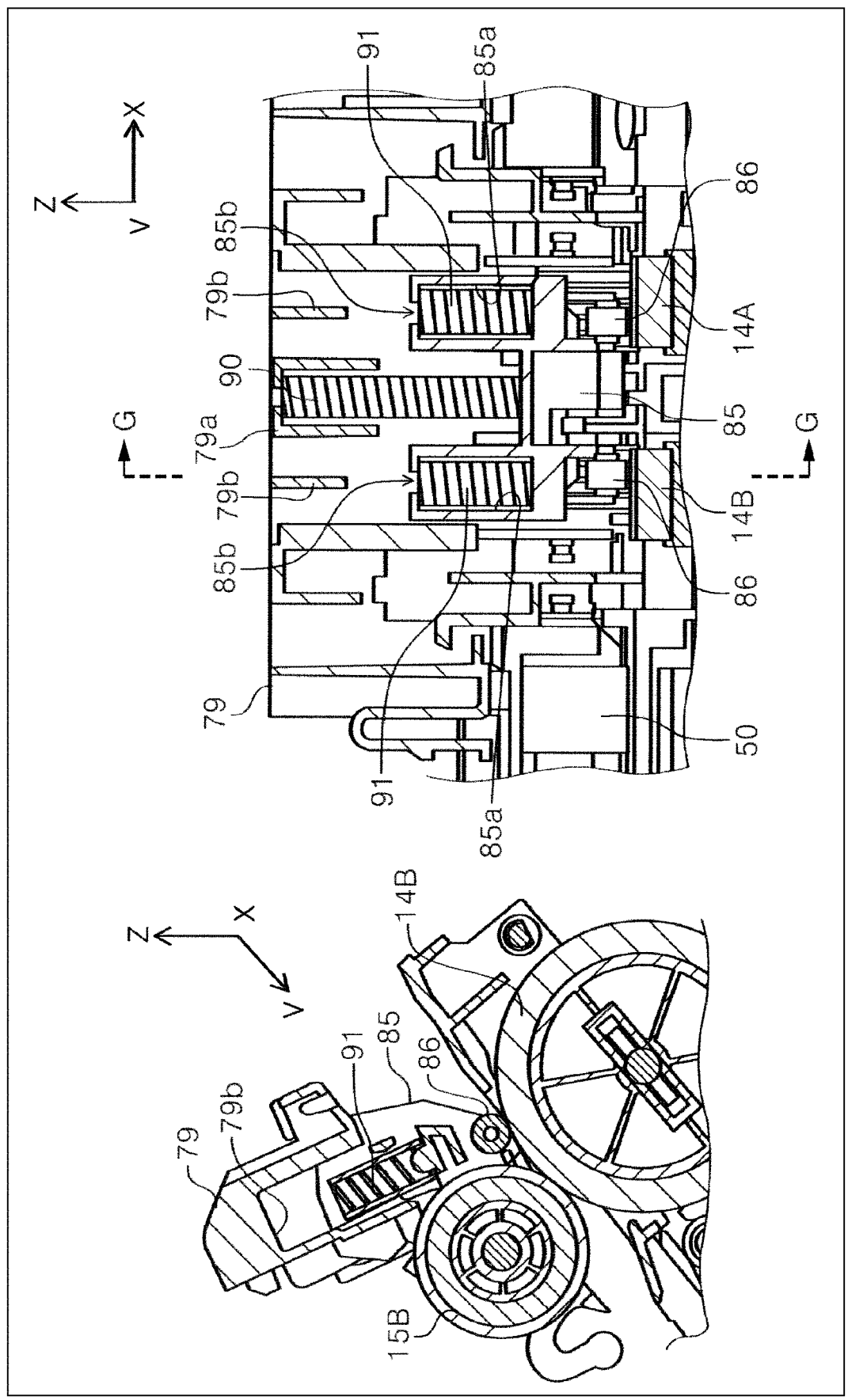
FIG. 14 includes a side view and a front view illustrating a hold-down member and a spring that presses down the hold-down member.
Figure 15:
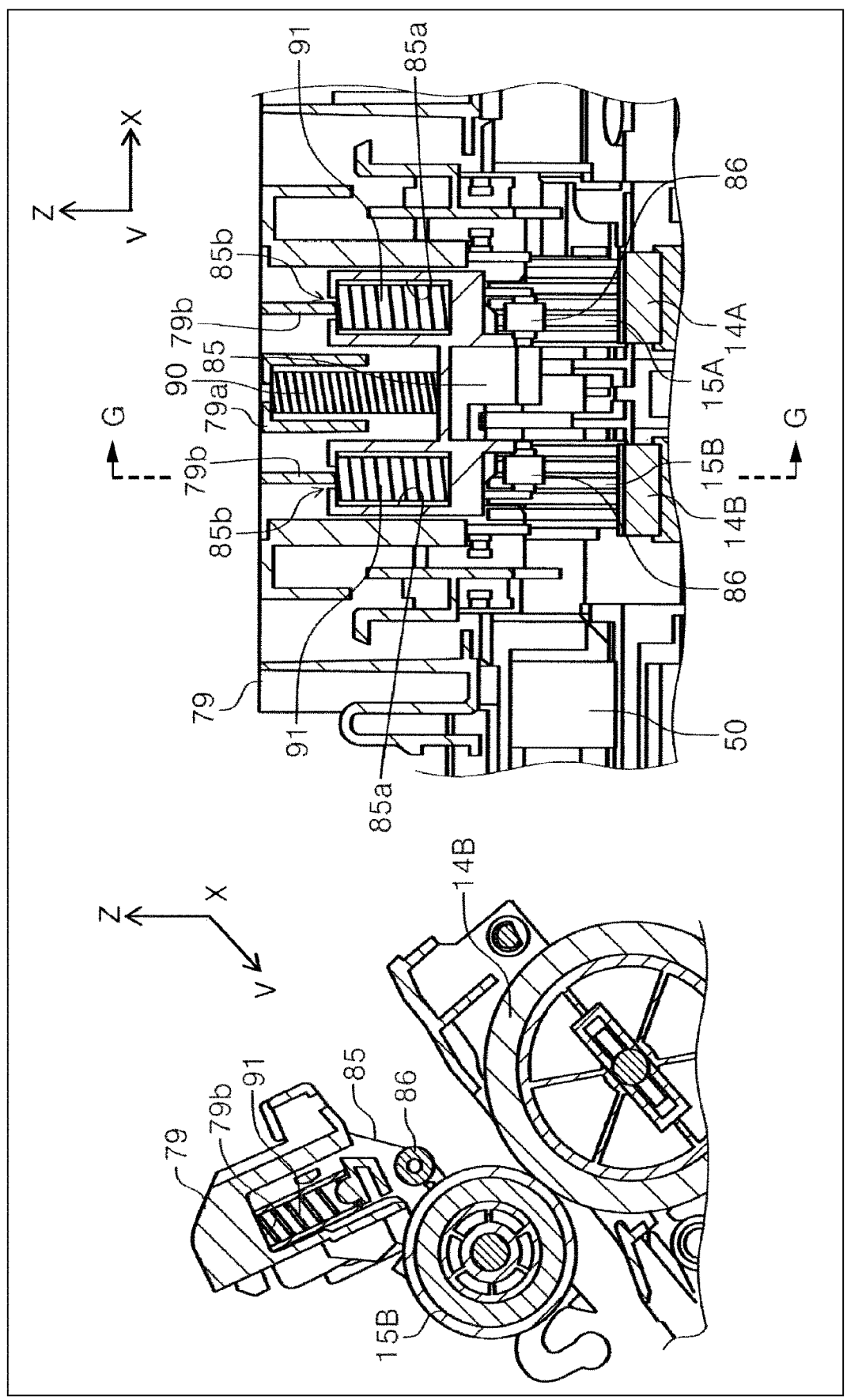
FIG. 15 includes a side view and a front view illustrating the hold-down member and the spring that presses down the hold-down member.
Figure 16:
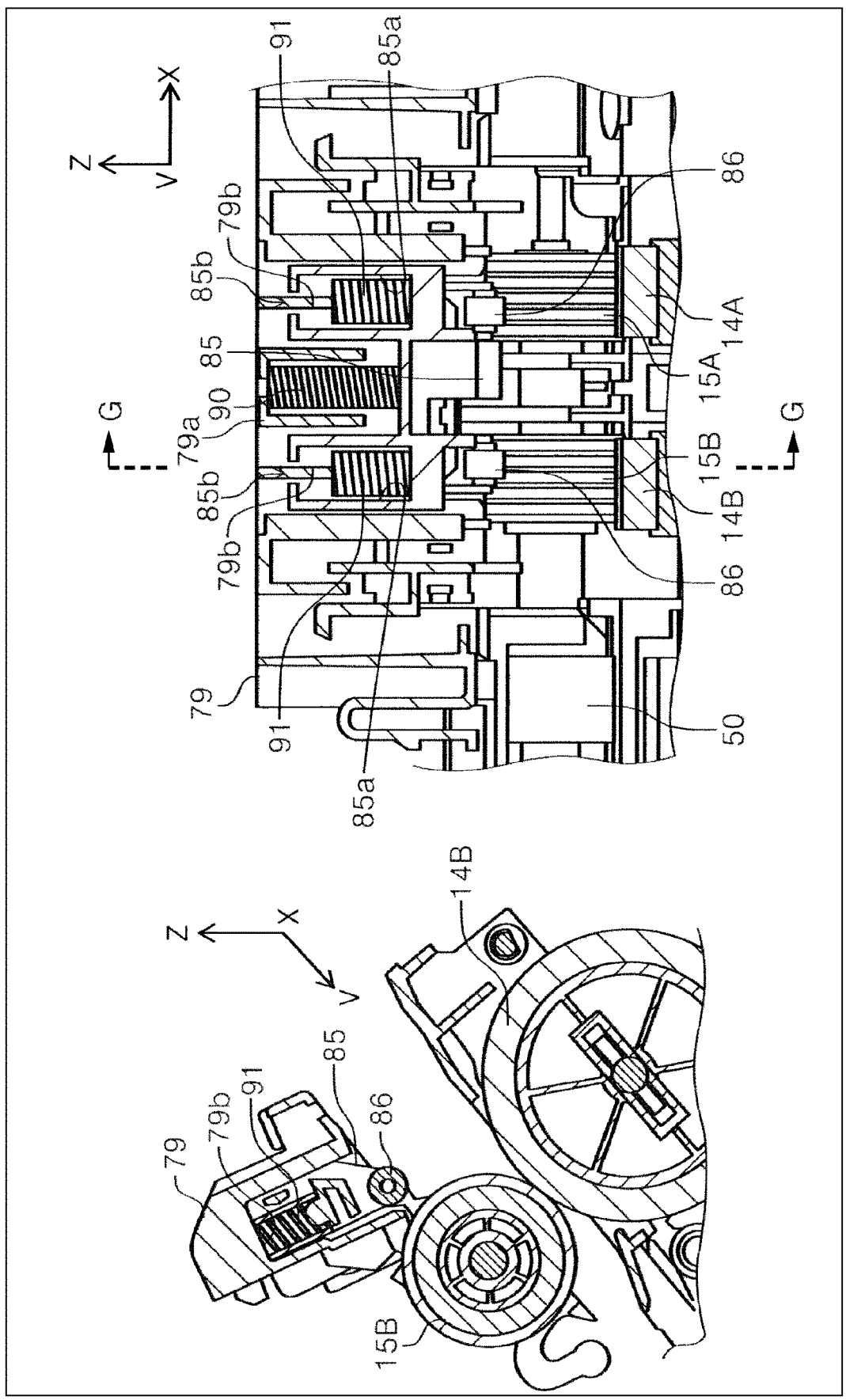
FIG. 16 includes a side view and a front view illustrating the hold-down member and the spring that presses down the hold-down member.

As illustrated in FIGS. 14 to 16, the hold-down member 85 is attached to the frame 79 in a slidable manner in the thickness direction of the stack of documents. Two types of springs having different lengths are used to press the hold-down member 85. Specifically described, one first pressing spring 90 and two second pressing springs 91 are employed. In other words, the pressing member includes the first pressing spring 90 and the second pressing springs 91 in this embodiment. The first pressing spring 90 exerts a spring force between a spring contact 79a of the frame 79 and the hold-down member 85. The second pressing spring 91 exerts a spring force between a spring contact 79b of the frame 79 and the hold-down member 85. The second pressing spring 91 is held in a spring holder 85a of the hold-down member 85. When the spring contact 79b enters the spring holder 85a through an opening 85b in the upper portion of the spring holder 85a, the second pressing spring 91 exerts a spring force between the spring contact 79b and the hold-down member 85.

When the number of loaded documents is small or the thickness of the stack of documents is smaller than a predetermined value, as illustrated in FIG. 14, the spring contact 79b does not enter the spring holder 85a through the opening 85b. In this state, the hold-down member 85 receives only a spring force from the first pressing spring 90. When the number of documents increases, as illustrated in FIG. 15, the spring contact 79b partly enters the spring holder 85a through the opening 85b, and then when the number of documents further increases, as illustrated in FIG. 16, the spring contact 79b enters the spring holder 85a through the opening 85b and the second pressing spring 91 exerts a spring force. In FIGS. 14 to 16, the left figures are cross-sectional views taken along line G in the right figures.

The above-described configuration provides the following operational advantages. Unsuccessful document feeding generally results from two causes including multiple feed and no feed. The multiple feed problem may occur, for example, due to insufficient friction force between the separation roller 15 and the document, insufficient torque of the separation roller 15, or high friction force between the documents pressed by the hold-down member 85. The no feed problem may occur, for example, due to insufficient friction force between the feeding roller 14 and the document on the bottom and high friction force between the document on the bottom and the upper cover 10. To solve both the multiple feed problem and the no feed problem, all the above-described various causes need to be considered. In this embodiment, regarding the relationship between the document pressing force of the hold-down member 85 and the number of loaded documents, i.e., the thickness of the stack of documents, the followings are found: if the document pressing force of the hold-down member 85 becomes too large with the number of loaded documents being small, the multiple feed problem would occur, and if the document pressing force of the hold-down member 85 becomes insufficient with the number of loaded documents being large, the no feed problem would occur.

In view of the above, in this embodiment, when the number of loaded documents is small, only the first pressing spring 90 exerts a spring force, and when the number of loaded documents is large, both the first and second pressing springs 90 and 91 exert a spring force. This configuration reduces the multiple feed caused when the number of loaded documents is small and the no feed caused when the number of loaded documents is large.

Next, with reference to FIGS. 18 and 19, a guide surface 11a located downstream of the feeding roller 14 is described. In FIG. 18, a straight line S0 is a common tangent line to the rollers including the feeding roller 14, the transportation drive roller 16a, and the discharge drive roller 17a. In other words, the feeding roller 14, the transportation drive roller 16a, and the discharge drive roller 17a are positioned such that the outer surfaces of the rollers are in contact with the common tangent line S0. Thus, the document transportation route T extends in a straight line, enabling thick documents and hard paper documents to be reliably transported.

The reference numeral D1 indicates a contact point between the feeding roller 14 and the common tangent line S0. The reference numeral N1 indicates a document nipping position where a document is pinched between the feeding roller 14 and the separation roller 15. As illustrated, the nipping position N1 and the contact point D1 are not located at the same position. The nipping position N1 is located downstream of the contact point D1 in the document feeding direction. In this configuration, the front end of the document sent from the nipping position N1 is positioned below the common tangent line S0. A straight line S1 indicates a tangent line to the feeding roller 14 and the separation roller 15 at the nipping position N1 and indicates a direction to which the front end of the document travels. The tangent line S1 intersects the common tangent line S0. The guide surface 11a that allows the front end of the document, which was sent downstream from the nipping position N1, to travel upward along the guide surface 11a is disposed downstream of the nipping position N1 and below the common tangent line S0.

The guide surface 11a is included in the route forming member 11. As illustrated in FIG. 19, the guide surfaces 11a are located at the same positions as the feeding rollers 14 in the X axis direction. The route forming member 13 is disposed downstream of the guide surfaces 11a. Although the document sent from the nipping position N1 is guided downstream by the guide surfaces 11a and the route forming member 13, the traveling direction of the front end of the document is determined by the sloping angle of the guide surfaces 11a until the front end of the document is pinched between the transportation rollers 16. As described above, since the guide surface 11a allows the front end of the document, which was sent downstream from the nipping position N1, to travel upward along the guide surface 11a, the nipping position N1 may be positioned close to the common tangent line S0 or may be positioned below the common tangent line S0 as in this embodiment, instead of being spaced apart from the common tangent line S0 to the upper side. In any of the cases, the document travels downstream without catching on the route forming member 13 at the front end. This configuration leads to a reduction in height of the apparatus.

Furthermore, in this embodiment, the front end of the document guided upward by the guide surface 11a comes in contact with the outer surface of the transportation follower roller 16b, and a traveling direction Q in which the front end of the document travels toward the transportation follower roller 16b forms an acute angle α with a tangent line S2 to the transportation follower roller 16b at the contact point between the front end of the document and the outer surface of the transportation follower roller 16b. In this configuration, the front end of the document is unlikely to come in contact with the outer surface of the transportation follower roller 16b, preventing paper jam. The angle α may be smaller than 45 degrees.

In this embodiment, a document feeder is employed in a scanner, which is an example of an image reading apparatus, but may be employed in a recording apparatus including a recording head that records on a medium, such as a printer. Furthermore, the configuration of the regulating member 80 and the configuration of the first guide surface 24a and the second guide surface 24b are applicable to a document feeder other than the document feeder having the straight document transportation route T and the document feeder having the document transportation route T extending obliquely downward from upstream to downstream. Furthermore, the configurations are applicable to a document feeder having the tangent line S1 (FIG. 18) directed in any direction and a document feeder either with or without the guide surface 11a.

What is claimed is:

1. An image reading apparatus comprising:
   a loading tray on which a document is loaded;
   a feeding roller configured to feed the document on the loading tray;
   a separation roller configured to pinch the document with the feeding roller at a nipping position for separation;
   a first sending roller located downstream of the feeding roller on a document transportation route on which the document travels and configured to send the document downstream on the document transportation route;
   a read sensor located downstream of the first sending roller on the document transportation route and configured to read the document; and
   a second sending roller located downstream of the read sensor on the document transportation route and configured to send the document downstream on the document transportation route, wherein
   a guide surface is disposed downstream of the nipping position on the document transportation route and below a common tangent line to the first sending roller and the second sending roller,
   the document transportation route extends obliquely downward from upstream to downstream, and
   the guide surface is positioned to come in contact with a front end of the document sent downward from the nipping position beyond the common tangent line to guide the document upward toward the common tangent line.

2. The image reading apparatus according to claim 1, wherein the nipping position is located below the common tangent line.

3. The image reading apparatus according to claim 1, further comprising a follower roller opposed to the first sending roller and configured to pinch the document with the first sending roller, wherein the front end of the document guided by the guide surface comes in contact with an outer surface of the follower roller, and a traveling direction of the front end of the document to the follower roller forms an acute angle with a tangent line to the outer surface of the follower roller at a position in contact with the front end of the document.

4. The image reading apparatus according to claim 1, wherein a common tangent line to the first sending roller and the second sending roller is in contact with an outer surface of the feeding roller.

5. The image reading apparatus according to claim 1, further comprising regulators located upstream of the nipping position and spaced apart from each other in a document width direction intersecting a document transportation direction, the regulators being configured to be in contact with front ends of documents except for at least a document on the bottom among a stack of documents on the loading tray to limit contact of the front ends with the separation roller.

6. The image reading apparatus according to claim 5, wherein the regulators are located on both sides of the nipping position in the document width direction and are included in a limiting member, and
   the limiting member is rotatable when viewed in the document transportation direction.

7. The image reading apparatus according to claim 6, wherein the regulators are movable in a thickness direction of the stack of documents, and
   the image reading apparatus further comprising:
   an operation portion manipulated by a user; and
   a movement convertor configured to convert movement of the operation portion into movement of the regulators.

8. The image reading apparatus according to claim 7, further comprising a retainer holding the operation portion in a position, the retainer including an elastic member elastically deformable by application of force from the regulators.

9. The image reading apparatus according to claim 1, further comprising:
   a flap configured to rotate and prevent contact between documents to be fed and the separation roller; and
   a set guide configured to move and engage with the flap to prevent rotation of the flap before feeding, wherein
   the set guide moves downward after start of feeding to put the flap in a rotatable state, and
   the set guide starts to move downward when or after a separation load reaches the maximum value in which the separation load is force that pinches a document between the feeding roller and the separation roller.

* * * * *